(12) United States Patent
Yang et al.

(10) Patent No.: US 11,270,030 B2
(45) Date of Patent: Mar. 8, 2022

(54) SYSTEM AND METHOD FOR CONSENSUS MANAGEMENT

(71) Applicant: ALIPAY (HANGZHOU) INFORMATION TECHNOLOGY CO., LTD., Zhejiang (CN)

(72) Inventors: Wenlong Yang, Hangzhou (CN); Yujun Peng, Hangzhou (CN)

(73) Assignee: ALIPAY (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/084,772

(22) Filed: Oct. 30, 2020

(65) Prior Publication Data
US 2021/0049306 A1 Feb. 18, 2021

Related U.S. Application Data

(63) Continuation of application No. PCT/CN2019/119375, filed on Nov. 19, 2019.

(51) Int. Cl.
*H04L 29/06* (2006.01)
*G06F 21/64* (2013.01)
(Continued)

(52) U.S. Cl.
CPC ........ *G06F 21/645* (2013.01); *G06F 16/2246* (2019.01); *G06F 16/2379* (2019.01);
(Continued)

(58) Field of Classification Search
CPC ......... H04L 63/00; H04L 9/30; H04L 9/3247; H04L 63/12; G06F 16/00; G06F 21/645;
(Continued)

(56) References Cited

U.S. PATENT DOCUMENTS

2014/0122866 A1 5/2014 Haeger et al.
2015/0120567 A1 4/2015 Van Rooyen et al.
(Continued)

FOREIGN PATENT DOCUMENTS

| CN | 108712423 A | 10/2018 |
|---|---|---|
| CN | 109508954 A | 3/2019 |
| WO | 2018/006072 A1 | 1/2018 |

OTHER PUBLICATIONS

Written Opinion and International Search Report for PCT Application No. PCT/CN2019/119375 dated Aug. 18, 2020.
(Continued)

*Primary Examiner* — Joseph P Hirl
*Assistant Examiner* — Leynna Truvan

(57) ABSTRACT

Methods, systems, and apparatus, including computer programs encoded on computer storage media, for blockchain-based consensus management, are provided. One of the methods includes: obtaining a request for creating a consensus template, wherein the request comprises information about a plurality of participating entities associated with the consensus template; generating, based on the request, a dataset representing a hierarchical structure of the participating entities associated with the consensus template; creating a blockchain transaction for registering the consensus template to a blockchain, wherein the blockchain transaction comprises the dataset representing the hierarchical structure of the participating entities; and sending, to one or more blockchain nodes associated with the blockchain for adding to the blockchain, the blockchain transaction for registering the consensus template to the blockchain.

20 Claims, 15 Drawing Sheets

(51) Int. Cl.
*G06F 16/23* (2019.01)
*G06F 16/22* (2019.01)
*H04L 9/30* (2006.01)
*H04L 9/32* (2006.01)

(52) U.S. Cl.
CPC .............. *H04L 9/30* (2013.01); *H04L 9/3247* (2013.01); *H04L 63/12* (2013.01)

(58) Field of Classification Search
CPC ... G06F 16/2379; G06F 16/2246; H04W 4/00
See application file for complete search history.

(56) References Cited

U.S. PATENT DOCUMENTS

| | | |
|---|---|---|
| 2016/0224949 A1 | 8/2016 | Thomas et al. |
| 2017/0048170 A1* | 2/2017 | Smullen ................. H04L 67/02 |
| 2017/0048217 A1 | 2/2017 | Biggs et al. |
| 2017/0132626 A1 | 5/2017 | Kennedy |
| 2017/0230375 A1 | 8/2017 | Kurian |
| 2017/0243025 A1 | 8/2017 | Kurian et al. |
| 2017/0289111 A1 | 10/2017 | Voell |
| 2018/0227116 A1 | 8/2018 | Chapman et al. |
| 2018/0343114 A1 | 11/2018 | Ben-Ari |
| 2018/0349621 A1 | 12/2018 | Schvey et al. |
| 2018/0365686 A1 | 12/2018 | Kondo et al. |
| 2019/0013932 A1 | 1/2019 | Maino et al. |
| 2019/0149325 A1* | 5/2019 | Garagiola ............. H04L 9/3263 380/278 |
| 2019/0180311 A1 | 6/2019 | Chan et al. |
| 2019/0207759 A1 | 7/2019 | Chan et al. |
| 2019/0215159 A1 | 7/2019 | Notani |
| 2019/0266312 A1 | 8/2019 | Mintz et al. |
| 2019/0311358 A1 | 10/2019 | Bhagavatha et al. |
| 2019/0325044 A1 | 10/2019 | Gray |
| 2019/0349426 A1* | 11/2019 | Smith .................... H04L 45/20 |
| 2020/0027089 A1 | 1/2020 | Kuchar et al. |
| 2020/0192770 A1* | 6/2020 | Walid ................... G06Q 20/389 |

OTHER PUBLICATIONS

Search Report for European Application No. 19 849 977.4 dated Feb. 18, 2021.

\* cited by examiner

1700

1710: obtaining a request for a status of a consensus object associated with a blockchain, wherein the consensus object comprises a plurality of parameters associated with a hierarchical structure of a plurality of participating entities

1720: obtaining, from the blockchain, a plurality of values respectively associated with the parameters of the consensus object

1730: generating, based on the plurality of values, a status summary of the consensus object

1740: returning the status summary of the consensus object

Obtaining Module
1810

Generating Module
1820

Creating Module
1830

Sending Module
1840

FIG. 18

SYSTEM AND METHOD FOR CONSENSUS MANAGEMENT

CROSS REFERENCE TO RELATED APPLICATION

The present application is a continuation application of International Patent Application No. PCT/CN2019/119375, filed on Nov. 19, 2019, and entitled "SYSTEM AND METHOD FOR CONSENSUS MANAGEMENT", the entire contents of which are incorporated herein by reference.

TECHNICAL FIELD

This application generally relates to methods and devices for managing consensus based on blockchain technology.

BACKGROUND

Coordination among multiple entities having different roles, locations, or procedures is often required for carrying out real-world projects and tasks. The entities may or may not have trust relationships between each other. The trust relationships among the entities may vary depending on the scenario. Furthermore, the entities may have hierarchical relationships or dependencies among themselves. In order to coordinate with each other and engage in collective decision-making, the multiple entities may need to reach consensus regarding various facts about a project. Such facts may include, for example, a status of the project, progress made by each participating entity in the project, supporters and opponents of a decision regarding the project, or other suitable facts. For example, for a warehouse receipt to be legitimately issued, various participating entities may need to approve its validity. The participating entities may include a storage company, a supply chain company, and an insurance agency. One or more individuals may be authorized to represent each of the participating entities in collectively approving the warehouse receipt.

Therefore, it is desirable to have a reliable, transparent, and efficient system for facilitating the achievement of consensus among multiple participating entities and for recording the results and details of the consensus processes. It is further desirable for the system to be customizable by the entities and capable of accommodating complex relationships among the participating entities in managing consensus. For example, it may be desirable for the system to recognize that approval of the warehouse receipt by any authorized personnel associated with the storage company is sufficient to establish approval by the storage company. Furthermore, because projects may often have common or repetitive cooperation scenarios (e.g., warehouse receipts for different batches of products handled by the same companies), it is desirable for the system to take advantage of the repetitive nature of the scenarios to improve efficiency and reduce redundancy.

A blockchain may comprise a growing list of records contained in linked blocks and secured by cryptographic techniques. Each block of a blockchain may contain transaction information, account information, information about one or more previous blocks, and other related information. A blockchain may be implemented in a peer-to-peer network comprising a plurality of blockchain nodes adhering to a protocol for inter-node communication, transaction or block validation, and consensus formation. Blockchain provides a way to create and maintain permanent records and make the records accessible to a plurality of parties. Blockchain technology has enabled various applications for consensus management among trusted or untrusted parties. For example, multi-signature transactions on various blockchain networks may require signatures from multiple parties in order to be validated. However, such applications may not be customizable to accommodating complex relationships among different parties, nor be capable of recognizing common features or patterns among different instances of consensus.

SUMMARY

Various embodiments of the specification include, but are not limited to, systems, methods, and non-transitory computer readable media for managing consensus based on blockchain technology.

According to some embodiments, a computer-implemented method for blockchain-based consensus management comprises obtaining a request for creating a consensus template, wherein the request comprises information about a plurality of participating entities associated with the consensus template; generating, based on the request, a dataset representing a hierarchical structure of the participating entities associated with the consensus template; creating a blockchain transaction for registering the consensus template to a blockchain, wherein the blockchain transaction comprises the dataset representing the hierarchical structure of the participating entities; and sending, to one or more blockchain nodes associated with the blockchain for adding to the blockchain, the blockchain transaction for registering the consensus template to the blockchain.

In some embodiments, the information about the plurality of participating entities comprises: an identifier associated with each of one or more of the participating entities; a public key of a blockchain account associated with each of one or more of the participating entities; contact information associated with each of one or more of the participating entities; information associated with the hierarchical structure of the participating entities; or a weight assigned to each of one or more of the participating entities.

In some embodiments, the method further comprises: obtaining, from the request for creating the consensus template, one or more criteria for determining achievement of consensus; and storing the one or more criteria for determining achievement of consensus.

In some embodiments, the request for creating the consensus template comprises a JavaScript Object Notation (JSON) file.

In some embodiments, the generating a dataset representing a hierarchical structure of the participating entities associated with the consensus template comprises: parsing the request for creating the consensus template to obtain a tree structure representing the hierarchical structure of the participating entities; and generating one or more arrays corresponding to the tree structure.

In some embodiments, the tree structure comprises a plurality of nodes, the plurality of nodes comprising a root node, one or more branch nodes, and a plurality of leaf nodes. The tree structure comprises one or more weights respectively associated with one or more of the nodes of the tree structure. Each of the leaf nodes corresponds to one of the participating entities associated with the consensus template.

In some embodiments, one or more of the leaf nodes each corresponds to an individual associated with an entity. A parent node of the one or more of the leaf nodes corresponds to the entity.

In some embodiments, the one or more arrays comprise: an array comprising one or more serial numbers associated with one or more of the nodes of the tree structure; an array comprising one or more serial numbers associated with one or more parent nodes of the one or more of the nodes of the tree structure; or an array comprising the one or more weights respectively associated with the one or more of the nodes of the tree structure.

In some embodiments, the blockchain transaction for registering the consensus template to a blockchain is executable to invoke a blockchain contract configured to register one or more consensus templates to the blockchain.

In some embodiments, the obtaining a request for creating a consensus template comprises obtaining the request for creating the consensus template from a computing device associated with one of the participating entities associated with the consensus template. The method further comprises returning a confirmation for creation of the consensus template to the computing device associated with the one of the participating entities.

According to other embodiments, a system for blockchain-based consensus management comprises one or more processors and one or more computer-readable memories coupled to the one or more processors and having instructions stored thereon that are executable by the one or more processors to perform operations comprising obtaining a request for creating a consensus template, wherein the request comprises information about a plurality of participating entities associated with the consensus template; generating, based on the request, a dataset representing a hierarchical structure of the participating entities associated with the consensus template; creating a blockchain transaction for registering the consensus template to a blockchain, wherein the blockchain transaction comprises the dataset representing the hierarchical structure of the participating entities; and sending, to one or more blockchain nodes associated with the blockchain for adding to the blockchain, the blockchain transaction for registering the consensus template to the blockchain.

According to yet other embodiments, a non-transitory computer-readable storage medium is configured with instructions executable by one or more processors to cause the one or more processors to perform operations comprising obtaining a request for creating a consensus template, wherein the request comprises information about a plurality of participating entities associated with the consensus template; generating, based on the request, a dataset representing a hierarchical structure of the participating entities associated with the consensus template; creating a blockchain transaction for registering the consensus template to a blockchain, wherein the blockchain transaction comprises the dataset representing the hierarchical structure of the participating entities; and sending, to one or more blockchain nodes associated with the blockchain for adding to the blockchain, the blockchain transaction for registering the consensus template to the blockchain.

According to still other embodiments, an apparatus for blockchain-based consensus management comprises an obtaining module for obtaining a request for creating a consensus template, wherein the request comprises information about a plurality of participating entities associated with the consensus template; a generating module for generating, based on the request, a dataset representing a hierarchical structure of the participating entities associated with the consensus template; a creating module for creating a blockchain transaction for registering the consensus template to a blockchain, wherein the blockchain transaction comprises the dataset representing the hierarchical structure of the participating entities; and a sending module for sending, to one or more blockchain nodes associated with the blockchain for adding to the blockchain, the blockchain transaction for registering the consensus template to the blockchain.

According to some embodiments, a computer-implemented method for blockchain-based consensus management comprises: obtaining a request for creating a consensus object requiring consensus of a plurality of participating entities, wherein the request for creating the consensus object comprises an identifier of a consensus template associated with a hierarchical structure of the participating entities; initializing, based on the hierarchical structure of the participating entities associated with the consensus template, a plurality of parameters associated with the consensus object, wherein the parameters comprise a parameter corresponding to each of the participating entities, and wherein the initializing comprises setting each of the parameters to an initial value; creating a blockchain transaction for registering the consensus object to the blockchain, wherein the blockchain transaction for registering the consensus object to the blockchain comprises the initial value associated with each of the parameters; and sending, to one or more blockchain nodes associated with a blockchain for adding to the blockchain, the blockchain transaction for registering the consensus object to the blockchain.

In some embodiments, the blockchain transaction further comprises a plurality of properties of the consensus object. The properties comprise: the identifier of the consensus template; an identifier of the consensus object; an identifier associated with each of one or more of the participating entities; a public key of a blockchain account associated with each of one or more of the participating entities; or a weight assigned to each of one or more of the participating entities.

In some embodiments, the initializing a plurality of parameters associated with the consensus object comprises: obtaining a tree structure representing the hierarchical structure of the participating entities, the tree structure comprising a plurality of nodes; generating an array comprising a plurality of positions, each of the positions corresponding to one of the nodes of the tree structure, wherein the positions respectively correspond to the parameters associated with the consensus object; and setting each of the positions of the array to the initial value for the parameter corresponding to the position.

In some embodiments, the obtaining a request for creating a consensus object comprises obtaining the request for creating the consensus object from a computing device associated with one of the participating entities associated with the consensus object. The method further comprises returning a confirmation for creation of the consensus object to the computing device associated with the one of the participating entities.

In some embodiments, the method further comprises sending, to one or more computing devices associated with one or more of the participating entities associated with the consensus object, a notification for creation of the consensus object, wherein the notification comprises an identifier of the consensus object and a request for approval of the consensus object.

According to other embodiments, a system for blockchain-based consensus management comprises one or more processors and one or more computer-readable memories coupled to the one or more processors and having instructions stored thereon that are executable by the one or more processors to perform operations comprising obtaining a request for creating a consensus object requiring consensus of a plurality of participating entities, wherein the request for creating the consensus object comprises an identifier of a consensus template associated with a hierarchical structure of the participating entities; initializing, based on the hierarchical structure of the participating entities associated with the consensus template, a plurality of parameters associated with the consensus object, wherein the parameters comprise a parameter corresponding to each of the participating entities, and wherein the initializing comprises setting each of the parameters to an initial value; creating a blockchain transaction for registering the consensus object to the blockchain, wherein the blockchain transaction for registering the consensus object to the blockchain comprises the initial value associated with each of the parameters; and sending, to one or more blockchain nodes associated with a blockchain for adding to the blockchain, the blockchain transaction for registering the consensus object to the blockchain.

According to yet other embodiments, a non-transitory computer-readable storage medium is configured with instructions executable by one or more processors to cause the one or more processors to perform operations comprising obtaining a request for creating a consensus object requiring consensus of a plurality of participating entities, wherein the request for creating the consensus object comprises an identifier of a consensus template associated with a hierarchical structure of the participating entities; initializing, based on the hierarchical structure of the participating entities associated with the consensus template, a plurality of parameters associated with the consensus object, wherein the parameters comprise a parameter corresponding to each of the participating entities, and wherein the initializing comprises setting each of the parameters to an initial value; creating a blockchain transaction for registering the consensus object to the blockchain, wherein the blockchain transaction for registering the consensus object to the blockchain comprises the initial value associated with each of the parameters; and sending, to one or more blockchain nodes associated with a blockchain for adding to the blockchain, the blockchain transaction for registering the consensus object to the blockchain.

According to still other embodiments, an apparatus for blockchain-based consensus management comprises an obtaining module for obtaining a request for creating a consensus object requiring consensus of a plurality of participating entities, wherein the request for creating the consensus object comprises an identifier of a consensus template associated with a hierarchical structure of the participating entities; an initializing module for initializing, based on the hierarchical structure of the participating entities associated with the consensus template, a plurality of parameters associated with the consensus object, wherein the parameters comprise a parameter corresponding to each of the participating entities, and wherein the initializing comprises setting each of the parameters to an initial value; a creating module for creating a blockchain transaction for registering the consensus object to the blockchain, wherein the blockchain transaction for registering the consensus object to the blockchain comprises the initial value associated with each of the parameters; and a sending module for sending, to one or more blockchain nodes associated with a blockchain for adding to the blockchain, the blockchain transaction for registering the consensus object to the blockchain.

According to some embodiments, a computer-implemented method for blockchain-based consensus management comprises: obtaining an approval message for a consensus object associated with a blockchain, the consensus object comprising a plurality of parameters associated with a hierarchical structure of a plurality of participating entities, wherein the approval message comprises information associated with one of the participating entities and the one of the participating entities corresponds to one of the parameters; obtaining, based on the approval message, a digital signature associated with the one of the participating entities; authenticating the digital signature based on information associated with the consensus object; creating, based on the approval message, a blockchain transaction executable to set the parameter corresponding to the one of the participating entities to an updated value; and sending, to one or more blockchain nodes associated with the blockchain for adding to the blockchain, the blockchain transaction executable to set the parameter corresponding to the one of the participating entities to the updated value.

In some embodiments, the obtaining a digital signature associated with the one of the participating entities comprises: obtaining the digital signature from the approval message for the consensus object.

In some embodiments, the obtaining a digital signature associated with the one of the participating entities comprises: obtaining identity information associated with the one of the participating entities from the approval message for the consensus object; authenticating the identity information associated with the one of the participating entities; retrieving, based on the obtained identity information, a private key associated with the one of the participating entities; and generating the digital signature based on the private key associated with the one of the participating entities.

In some embodiments, the authenticating the digital signature comprises: obtaining a public key associated with the one of the participating entities from information associated with the consensus object; and verifying, based on the public key, that the digital signature is created based on a private key corresponding to the public key.

In some embodiments, the blockchain transaction executable to set the parameter corresponding to the one of the participating entities to the updated value is executable to invoke a blockchain contract configured to maintain values of the parameters associated with the consensus object.

In some embodiments, the blockchain transaction executable to set the parameter corresponding to the one of the participating entities to an updated value is further executable to set one or more other parameters associated with the consensus object to one or more updated values, respectively, wherein each of the other parameters has a dependency relationship with the parameter corresponding to the one of the participating entities.

In some embodiments, the creating a blockchain transaction executable to set the parameter corresponding to the one of the participating entities to an updated value comprises: obtaining a tree structure representing the hierarchical structure of the participating entities, the tree structure comprising a plurality of nodes, wherein the nodes of the tree structure respectively correspond to the parameters associated with the consensus object; identifying, from the tree structure, one or more other nodes in a branch connecting the node corresponding to the parameter of the one of the participating entities to a root node of the tree structure; and determining an updated value for each of the other nodes and the root node.

In some embodiments, the determining an updated value for each of the other nodes and the root node comprises, for each of the other nodes: determining the updated value of the other node to be a weighted sum of one or more values associated with one or more child nodes of the other node.

In some embodiments, the obtaining an approval message for the consensus object comprises obtaining the approval message for the consensus object from a computing device associated with the one of the participating entities associated with the consensus template. The method further comprises returning a confirmation for successful signing of the consensus object to the computing device associated with the one of the participating entities.

In some embodiments, the method further comprises: obtaining, from the blockchain, one or more updated values of one or more of the parameters associated with the consensus object; determining, based on the one or more updated values, that one or more criteria for determining approval of the consensus object are satisfied; and generating a blockchain transaction comprising a proof of the approval of the consensus object.

In some embodiments, the method further comprises: sending, to one or more blockchain nodes associated with the blockchain for adding to the blockchain, the blockchain transaction comprising the proof of the approval of the consensus object.

In some embodiments, the method further comprises: sending, to one or more blockchain nodes associated with a different blockchain for adding to the different blockchain, the blockchain transaction comprising the proof of the approval of the consensus object.

In some embodiments, the blockchain transaction comprising the proof of the approval of the consensus object is executable to invoke a blockchain contract executable to trigger one or more blockchain transactions based on the approval of the consensus object.

In some embodiments, the one or more criteria for determining approval of the consensus object comprise: a required number of participating entities approving the consensus object; or one or more required participating entities approving the consensus object.

According to other embodiments, a system for blockchain-based consensus management comprises one or more processors and one or more computer-readable memories coupled to the one or more processors and having instructions stored thereon that are executable by the one or more processors to perform operations comprising obtaining an approval message for a consensus object associated with a blockchain, the consensus object comprising a plurality of parameters associated with a hierarchical structure of a plurality of participating entities, wherein the approval message comprises information associated with one of the participating entities and the one of the participating entities corresponds to one of the parameters; obtaining, based on the approval message, a digital signature associated with the one of the participating entities; authenticating the digital signature based on information associated with the consensus object; creating, based on the approval message, a blockchain transaction executable to set the parameter corresponding to the one of the participating entities to an updated value; and sending, to one or more blockchain nodes associated with the blockchain for adding to the blockchain, the blockchain transaction executable to set the parameter corresponding to the one of the participating entities to the updated value.

According to yet other embodiments, a non-transitory computer-readable storage medium is configured with instructions executable by one or more processors to cause the one or more processors to perform operations comprising obtaining an approval message for a consensus object associated with a blockchain, the consensus object comprising a plurality of parameters associated with a hierarchical structure of a plurality of participating entities, wherein the approval message comprises information associated with one of the participating entities and the one of the participating entities corresponds to one of the parameters; obtaining, based on the approval message, a digital signature associated with the one of the participating entities; authenticating the digital signature based on information associated with the consensus object; creating, based on the approval message, a blockchain transaction executable to set the parameter corresponding to the one of the participating entities to an updated value; and sending, to one or more blockchain nodes associated with the blockchain for adding to the blockchain, the blockchain transaction executable to set the parameter corresponding to the one of the participating entities to the updated value.

According to still other embodiments, an apparatus for blockchain-based consensus management comprises a first obtaining module for obtaining an approval message for a consensus object associated with a blockchain, the consensus object comprising a plurality of parameters associated with a hierarchical structure of a plurality of participating entities, wherein the approval message comprises information associated with one of the participating entities and the one of the participating entities corresponds to one of the parameters; a second obtaining module for obtaining, based on the approval message, a digital signature associated with the one of the participating entities; an authenticating module for authenticating the digital signature based on information associated with the consensus object; a creating module for creating, based on the approval message, a blockchain transaction executable to set the parameter corresponding to the one of the participating entities to an updated value; and a sending module for sending, to one or more blockchain nodes associated with the blockchain for adding to the blockchain, the blockchain transaction executable to set the parameter corresponding to the one of the participating entities to the updated value.

According to some embodiments, a computer-implemented method for blockchain-based consensus management comprises: obtaining a request for a status of a consensus object associated with a blockchain, wherein the consensus object comprises a plurality of parameters associated with a hierarchical structure of a plurality of participating entities; obtaining, from the blockchain, a plurality of values respectively associated with the parameters of the consensus object; generating, based on the plurality of values, a status summary of the consensus object; and returning the status summary of the consensus object.

In some embodiments, the status summary of the consensus object comprises: a proof of approval of the consensus object.

In some embodiments, the status summary of the consensus object comprises: identity information associated with each of one or more of the participating entities that have approved the consensus object; a digital signature associated with each of the one or more of the participating entities that have approved the consensus object; or a weight assigned to each of the one or more of the participating entities that have approved the consensus object.

In some embodiments, the status summary of the consensus object comprises a JavaScript Object Notation (JSON) file.

In some embodiments, the generating a status summary of the consensus object comprises: constructing, based on information associated with the consensus object, a tree structure corresponding to the hierarchical structure of the participating entities; and generating the status summary of the consensus object based on the tree structure.

In some embodiments, the tree structure comprises a plurality of nodes, the plurality of nodes comprising a root node, one or more branch nodes, and a plurality of leaf nodes. Each of the nodes of the tree structure corresponds to one of the plurality of parameters associated with the consensus object. The status summary comprises a value of the parameter corresponding to the root node of the tree structure.

In some embodiments, the information associated with the consensus object comprises an array of a plurality of entries respectively corresponding to the parameters of the consensus object. The constructing a tree structure comprises organizing the array of entries according to the hierarchical structure of the participating entities.

In some embodiments, the constructing a tree structure comprises: creating a stack for containing one or more of the entries in the array; and for each of the entries in the array: obtaining the entry from the array; updating the stack based on the obtained entry; and adding the obtained entry to the tree structure, wherein a position of the obtained entry in the tree structure is based on the updated stack.

In some embodiments, the updating the stack based on the obtained entry comprises: adding the obtained entry to the stack; or removing one or more entries from the stack.

In some embodiments, the constructing a tree structure further comprises: creating one or more indices associated with the tree structure; updating the one or more indices based on the each obtained entry; and updating the stack based further on the one or more updated indices.

According to other embodiments, a system for blockchain-based consensus management comprises one or more processors and one or more computer-readable memories coupled to the one or more processors and having instructions stored thereon that are executable by the one or more processors to perform operations comprising obtaining a request for a status of a consensus object associated with a blockchain, wherein the consensus object comprises a plurality of parameters associated with a hierarchical structure of a plurality of participating entities; obtaining, from the blockchain, a plurality of values respectively associated with the parameters of the consensus object; generating, based on the plurality of values, a status summary of the consensus object; and returning the status summary of the consensus object.

According to yet other embodiments, a non-transitory computer-readable storage medium is configured with instructions executable by one or more processors to cause the one or more processors to perform operations comprising obtaining a request for a status of a consensus object associated with a blockchain, wherein the consensus object comprises a plurality of parameters associated with a hierarchical structure of a plurality of participating entities; obtaining, from the blockchain, a plurality of values respectively associated with the parameters of the consensus object; generating, based on the plurality of values, a status summary of the consensus object; and returning the status summary of the consensus object.

According to still other embodiments, an apparatus for blockchain-based consensus management comprises a first obtaining module for obtaining a request for a status of a consensus object associated with a blockchain, wherein the consensus object comprises a plurality of parameters associated with a hierarchical structure of a plurality of participating entities; a second obtaining module for obtaining, from the blockchain, a plurality of values respectively associated with the parameters of the consensus object; a generating module for generating, based on the plurality of values, a status summary of the consensus object; and a returning module for returning the status summary of the consensus object.

According to some embodiments, a system for blockchain-based consensus management comprises one or more processors and one or more computer-readable memories coupled to the one or more processors and having instructions stored thereon that are executable by the one or more processors to perform the method of any of the preceding embodiments.

According to yet other embodiments, a non-transitory computer-readable storage medium is configured with instructions executable by one or more processors to cause the one or more processors to perform the method of any of the preceding embodiments.

According to still other embodiments, an apparatus for blockchain-based consensus management comprises a plurality of modules for performing the method of any of the preceding embodiments.

Embodiments disclosed herein have one or more technical effects. In some embodiments, an online platform creates blockchain-based objects that correspond to projects that require consensus of various participating entities. This allows reliable, transparent, and efficient management and tracking of consensus processes among the participating entities. In other embodiments, the online platform enables registration of customizable blockchain-based templates for creating the blockchain-based objects. This allows flexible representation of various real-world consensus scenarios and reduction of repetitive work in programming the blockchain-based objects. In yet other embodiments, the blockchain-based templates created using the online platform encode complex hierarchical relationships among participating entities and complex criteria for achievement of consensus. This allows recordation and determination of consensus for complex business dealings and cooperative endeavors. In still other embodiments, the online platform provides various interfaces making available various blockchain-based functionalities related to defining and tracking consensus among different entities. This reduces the technical sophistication and resources needed for taking advantage of the various benefits (e.g., credibility, transparency) provided by blockchain-based consensus management.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as limiting.

BRIEF DESCRIPTION OF THE DRAWINGS

FIG. 17 illustrates a method for providing status information of a consensus object in accordance with some embodiments.

FIG. 18 illustrates a block diagram of a computer system for registering a consensus template in accordance with some embodiments.

DETAILED DESCRIPTION

Embodiments disclosed herein provide methods, systems, and apparatus associated with a blockchain-based platform for managing consensus among a plurality of participating entities. The platform may allow one or more of the participating entities to create one or more consensus objects, each corresponding to a project or task for which the participating entities need to reach consensus on. Inputs from one or more participating entities may be recorded in association with a consensus object and be used to determine whether consensus is reached with respect to the corresponding project or task. For projects or tasks that share common features or characteristics (e.g., the entities participating in the consensus, the weight of each entity in decision-making, the hierarchical structure of the entities, the order of the entities' obligations), the platform may allow one or more of the participating entities to create one or more consensus templates encoding the common features or characteristics. Multiple consensus objects may be created based on one consensus template and may share the information stored in association with the consensus template.

The platform may collect and register inputs from various participating entities in relation to a consensus object. The platform may also keep updated status of the consensus object and provide such status information to the participating entities. Furthermore, the platform may determine whether a consensus object has been approved and, if so, automatically trigger one or more subsequent actions based on the consensus.

The platform may perform various consensus-management functionalities by interacting with one or more blockchain networks and by invoking one or more blockchain contracts operating thereon. As an example, the platform may store data associated with one or more consensus templates and one or more consensus objects on a blockchain. As another example, the platform may obtain data associated with one or more consensus objects from a blockchain in order to determine the status of the one or more consensus objects. As yet another example, the platform may record one or more criteria for determining that consensus has been achieved (e.g., approval from a preset number of participating entities) and check one or more consensus objects to determine whether the consensus objects are approved. As still another example, the platform may generate and send one or more blockchain transactions to trigger one or more further steps after achievement of consensus for a particular consensus object. The use of blockchain in performing the consensus-management functionalities allows reliable and transparent recordation of the process in which consensus is reached.

Figure 1:
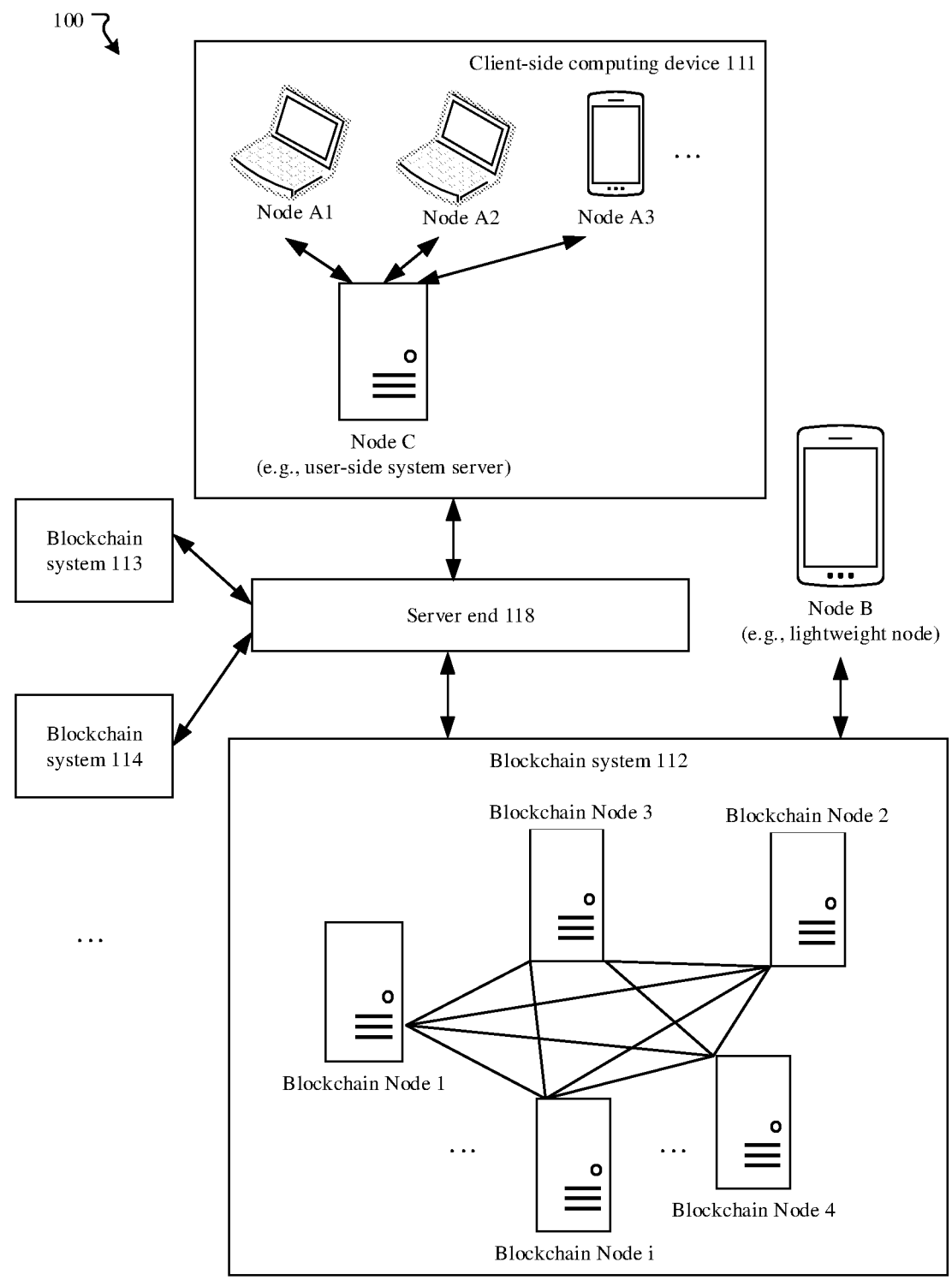
FIG. 1 illustrates a network environment associated with a blockchain in accordance with some embodiments.

FIG. 1 illustrates a network environment associated with a blockchain in accordance with some embodiments. As shown, in the environment 100, a client-side computing device 111 may couple to a server end 118, and the server end 118 and a Node B may couple to a blockchain system 112 through various communication networks. Similarly, the server end 118 may optionally couple to more blockchain systems similar to the blockchain system 112 such as blockchain system 113, blockchain system 114, etc. Each blockchain system may maintain one or more blockchains.

In some embodiments, the client-side computing device 111 may comprise one or more servers (e.g., Node C) and one or more other computing devices (e.g., Node A1, Node A2, Node A3). Node A1, Node A2, and Node A3 may couple to Node C. In some embodiments, Node C may be implemented by an entity (e.g., website, mobile phone Application, organization, company, enterprise), which has various local accounts (e.g., local accounts assessed from Node A1, Node A2, Node A3). For example, a mobile phone Application may have millions of end-users accessing the Application's server from respective user accounts. The Application's server may correspondingly store millions of user accounts. The components of the client-side computing device 111 and their arrangement may have many other configurations.

In some embodiments, the blockchain system 112 may comprise a plurality of blockchain nodes (e.g., Blockchain Node 1, Blockchain Node 2, Blockchain Node 3, Blockchain Node 4, Blockchain Node i, etc.) that maintain one or more blockchains (e.g., public blockchain, private blockchain, consortium blockchain, etc.). Other blockchain systems (e.g., blockchain system 113, etc.) may comprise a similar arrangement of blockchain nodes maintaining another blockchain. Each blockchain node may be found in one or more blockchain systems. The blockchain nodes may include full nodes. Full nodes may download every block and blockchain transaction and check them against the blockchain's consensus rules. The blockchain nodes may form a network with one blockchain node communicating with another. The order and the number of the blockchain nodes as shown are merely examples for illustration. The blockchain nodes may be implemented in servers, computers, etc. For example, each blockchain node may be implemented in a server or a cluster of servers. The cluster of servers may employ load balancing. Each blockchain node may correspond to one or more physical hardware devices or virtual devices coupled together via various types of communication methods such as TCP/IP. Depending on the classifications, the blockchain nodes may also be referred to as full nodes, Geth nodes, consensus nodes, etc.

In some embodiments, Node B may include a lightweight node. A lightweight node may not download the complete blockchain, but may instead just download the block headers to validate the authenticity of the blockchain transactions. Lightweight nodes may be served by and effectively dependent on full nodes (e.g., blockchain nodes in the blockchain system 112) to access more functions of the blockchain. The lightweight nodes may be implemented in electronic devices such as laptops, mobile phones, and the like by installing an appropriate software. In one embodiment, Node B may send a blockchain transaction to the blockchain system 112 for adding to the blockchain.

In some embodiments, there may be many more client-side computing devices coupled to the server end 118 similar to client-side computing device 111. The server end 118 may provide Blockchain-as-a-Service (BaaS) and be referred to as a BaaS cloud. In one embodiment, BaaS is a cloud service model in which clients or developers outsource behind-the-scenes aspects of a web or mobile application. BaaS may provide pre-written software for activities that take place on blockchains, such as user authentication, database management, and remote updating. The BaaS cloud may be implemented in a server, server cluster, or other devices. In one embodiment, the BaaS cloud provides an enterprise-level platform service based on blockchain technologies. This service may help clients to build a secure and stable blockchain environment as well as manage the deployment, operation, maintenance, and development of blockchain easily. The service features high security, high stability, ease-of-use, and openness and sharing. Based on the abundant security strategies and multi-tenant isolation of cloud, the BaaS cloud can provide advanced security protection using chip encryption technologies. Based on highly reliable data storage, this service provides end-to-end and highly available services that can scale up quickly without interruption. The BaaS cloud can provide enhanced administrative functions to help clients to build an enterprise-level blockchain network environment. The BaaS cloud can provide native support for standard blockchain applications and data, support mainstream open-source blockchain technologies like Hyperledger Fabric and Enterprise Ethereum—Quorum, to build an open and inclusive technology ecosystem.

In the environment 100, each of the systems, nodes, and devices may be installed with appropriate software (e.g., application program interface) and/or hardware (e.g., wires, wireless connections) to access other devices of the environment 100. In general, the systems, nodes, and devices may be able to communicate with one another through one or more wired or wireless networks (e.g., the Internet) through which data can be communicated. Each of the systems, nodes, and devices may include one or more processors and one or more memories coupled to the one or more processors. The memories may be non-transitory and computer-readable and configured with instructions executable by one or more processors to cause the one or more processors to perform operations described herein. The instructions may be stored in the memories or downloaded over a communications network without necessarily being stored in the memories. Although the systems, nodes, and devices are shown as separate components in this figure, it will be appreciated that these nodes and devices can be implemented as single devices or multiple devices coupled together. For example, Node B may be alternatively integrated into Blockchain Node 2.

The devices such as Node A1, Node A2, Node A3, Node B, and Node C may be installed with an appropriate blockchain software for initiating, forwarding, or accessing blockchain transactions. The term "blockchain transaction" may refer to a unit of task executed in a blockchain system and recorded in the blockchain upon verification. In some embodiments, the server end 118 may construct a blockchain contract based on information obtained from Node A1, A2, or A3. The server end 118 may add the blockchain contract in a blockchain transaction. After the server end 118 submits the blockchain transaction to the blockchain system, the blockchain nodes may verify the blockchain transaction for adding to the blockchain. If the blockchain transaction is added to the blockchain, the blockchain contract is deployed on the blockchain and initiated at a certain state. Through one or more additional blockchain transactions, the deployed blockchain contract may be invoked to update the certain state.

Blockchain transactions may be verified according to a consensus rule. For example, a POW (proof-of-work) consensus process is provided below. Notwithstanding, other types of consensus processes such as POS (proof-of-stake), DPOS (delegate-proof-of-stake), and PBFT (practical Byzantine Fault Tolerance) may be similarly applied to the disclosed systems and methods.

In some embodiments with respect to blockchain transaction verification, after receiving a blockchain transaction request of an unconfirmed blockchain transaction, a recipient blockchain node may perform some preliminary verification of the blockchain transaction. For example, Blockchain Node 1 may perform the preliminary verification after receiving a blockchain transaction from Node C. Once verified, the blockchain transaction may be stored in the database of the recipient blockchain node (e.g., Blockchain Node 1), which may also forward the blockchain transaction to one or more other blockchain nodes (e.g., Blockchain Node 3, Blockchain Node 4). Similarly, the each blockchain node may comprise or couple to a memory storing a database. The database may store a plurality of unconfirmed blockchain transactions. After receiving the blockchain transaction, the one or more other blockchain nodes may repeat the preliminary verification and broadcasting process done by the recipient blockchain node.

For verification, each blockchain node may select some of the blockchain transactions from the database according to its preference and form them into a proposed new block for the blockchain. The blockchain node may perform "mining" of the proposed new block by devoting computing power to solve complex mathematical problems. If the blockchain transaction involves a blockchain contract, the blockchain nodes may execute the blockchain contract locally in respective virtual machines (VMs). To handle the blockchain contracts, each blockchain node of the blockchain network runs a corresponding VM and executes the same instructions in the blockchain contract. A VM is a software emulation of a computer system based on computer architectures and provides functionality of a physical computer. VM in the blockchain context can be understood as a system designed to operate as a runtime environment for blockchain contracts.

A certain blockchain node that successfully mines the proposed new block of blockchain transactions in accordance with consensus rules may pack the new block into its local copy of the blockchain and multicast the results to other blockchain nodes. The certain blockchain node may be a blockchain node that has first successfully completed the verification, that has obtained a verification privilege, that has been chosen based on another consensus rule, etc. Then, the other blockchain nodes may follow the same order of execution performed by the certain blockchain node to locally execute the blockchain transactions in the new block, verify the execution results with one another (e.g., by performing hash calculations), and synchronize their copies of the blockchain with that of the certain blockchain node. By updating their local copies of the blockchain, the other blockchain nodes may similarly write such information in the blockchain transaction into respective local memories. As such, the blockchain contract can be deployed on the blockchain. If the verification fails at some point, the blockchain transaction is rejected.

The deployed blockchain contract may have an address, according to which the deployed contract can be accessed. A blockchain node may invoke the deployed blockchain contract by inputting certain parameters to the blockchain contract. In one embodiment, a deployed blockchain contract may be invoked to add or update certain information in the blockchain contract, thereby updating one or more states in the blockchain contract. In one embodiment, the one or more states of the blockchain contract may be retrieved from the blockchain by inquiring a corresponding blockchain transaction added to the blockchain. The most updated state may be reflected in the most recent relevant blockchain transaction. Notwithstanding the above, other types of blockchain systems and associated consensus rules may be applied to the disclosed devices and methods.

Figure 2:
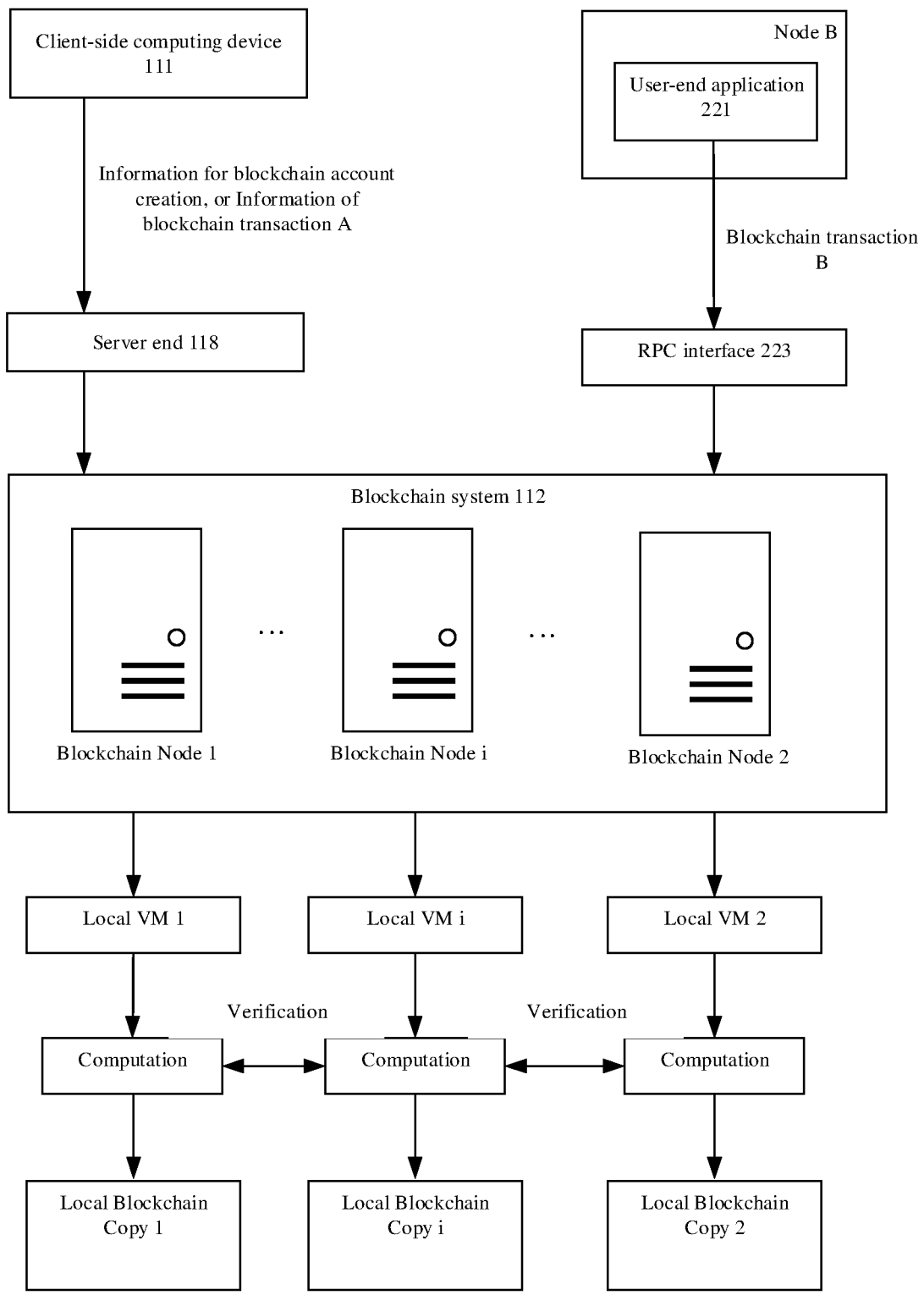
FIG. 2 illustrates a framework for implementing blockchain transactions in accordance with some embodiments.

FIG. 2 illustrates a framework for implementing blockchain transactions in accordance with some embodiments. In some embodiments, the client-side computing device 111 may transmit information to the server end 118. The information may be for creating a blockchain account, performing an action based on blockchain contract, etc. The blockchain may be maintained by the blockchain system 112. The server end 118 may construct a blockchain contract based on the information obtained from the client-side computing device 111. The server end 118 may add the blockchain contract in a blockchain transaction A. The server end 118 may sign the blockchain transaction on behalf of a user associated with the client-side computing device 111. For example, the blockchain transaction A may comprise information such as nonce (e.g., transaction serial number), from (e.g., a blockchain address of the user), to (e.g., empty if deploying a blockchain contract), transaction fee, signature (e.g., signature of the server end 118, signature of the user managed by the server end 118), value (e.g., transaction amount), data (e.g., the blockchain contract), etc. Then, the server end 118 may submit the blockchain transaction A to one or more blockchain nodes of the blockchain system 112 for adding to the blockchain.

After the blockchain transaction is added to the blockchain, the blockchain contract is deployed on the blockchain and initiated at a certain state. Through one or more additional blockchain transactions, the deployed blockchain contract may be invoked to update the certain state. In some embodiments, Node B may construct a signed blockchain transaction B and transmit it to the blockchain system 112 for execution. In one embodiment, the blockchain transaction B may be executed to invoke the deployed blockchain contract to update a state. In some embodiments, the blockchain transaction B may be programmed in source code at a user-end application 221. For example, a user or machine may program the blockchain transaction B. Node B may compile the source code using a corresponding compiler, which converts the source code into bytecode. The blockchain transaction B may comprise information such as nonce, from, to, transaction fee, value, signature, data, etc. Node B may send the blockchain transaction B to one or more blockchain nodes of the blockchain system 112 through a remote procedure call (RPC) interface 223 for execution. RPC is a protocol that a first program (e.g., user-end application) can use to request a service from a second program located in another computer on a network (e.g., blockchain node) without having to understand the network's details. When the first program causes a procedure to execute in a different address space, it is as if a normal (local) procedure call, without the programmer explicitly coding the details for the remote interaction.

In some embodiments, on receiving the blockchain transaction (e.g., blockchain transaction A or B), the recipient blockchain node may verify if the blockchain transaction is valid. For example, the signature and other formats may be verified. If the verification succeeds, the recipient blockchain node may broadcast the received blockchain transaction to the blockchain network including various other blockchain nodes. Some blockchain nodes may participate in the mining process of the blockchain transaction. The blockchain transaction may be chosen by a certain node for consensus verification to pack into a new block. If the blockchain transaction involves deploying a blockchain contract, the certain node may create a contract account for the blockchain contract in association with a contract account address. If the blockchain transaction involves invoking a deployed blockchain contract, the certain node may trigger its local VM to execute the received blockchain transaction, thereby invoking the deployed blockchain contract from its local copy of the blockchain and updating the states in the deployed blockchain contract. If the certain node succeeds in mining a new block, the certain node may broadcast the new block to other blockchain nodes.

Upon receiving the new block, the other blockchain nodes may perform verifications. If a consensus is reached that the new block is valid, the new block is respectively packed to the local copies of the blockchain maintained by the blockchain nodes. The blockchain nodes may similarly trigger their local VMs (e.g., local VM 1, local VM i, local VM 2) to execute the blockchain transactions in the new block, thus invoking local copies of the blockchain (e.g., local blockchain copy 1, local blockchain copy i, local blockchain copy 2) and making corresponding updates. The hardware machine of each blockchain node may have access to one or more virtual machines, which may be a part of or couple to the corresponding blockchain node. Each time, a corresponding local VM may be triggered to execute the blockchain transaction. Likewise, all other blockchain transactions in the new block will be executed. Lightweight nodes may also synchronize to the updated blockchain.

Figure 3:
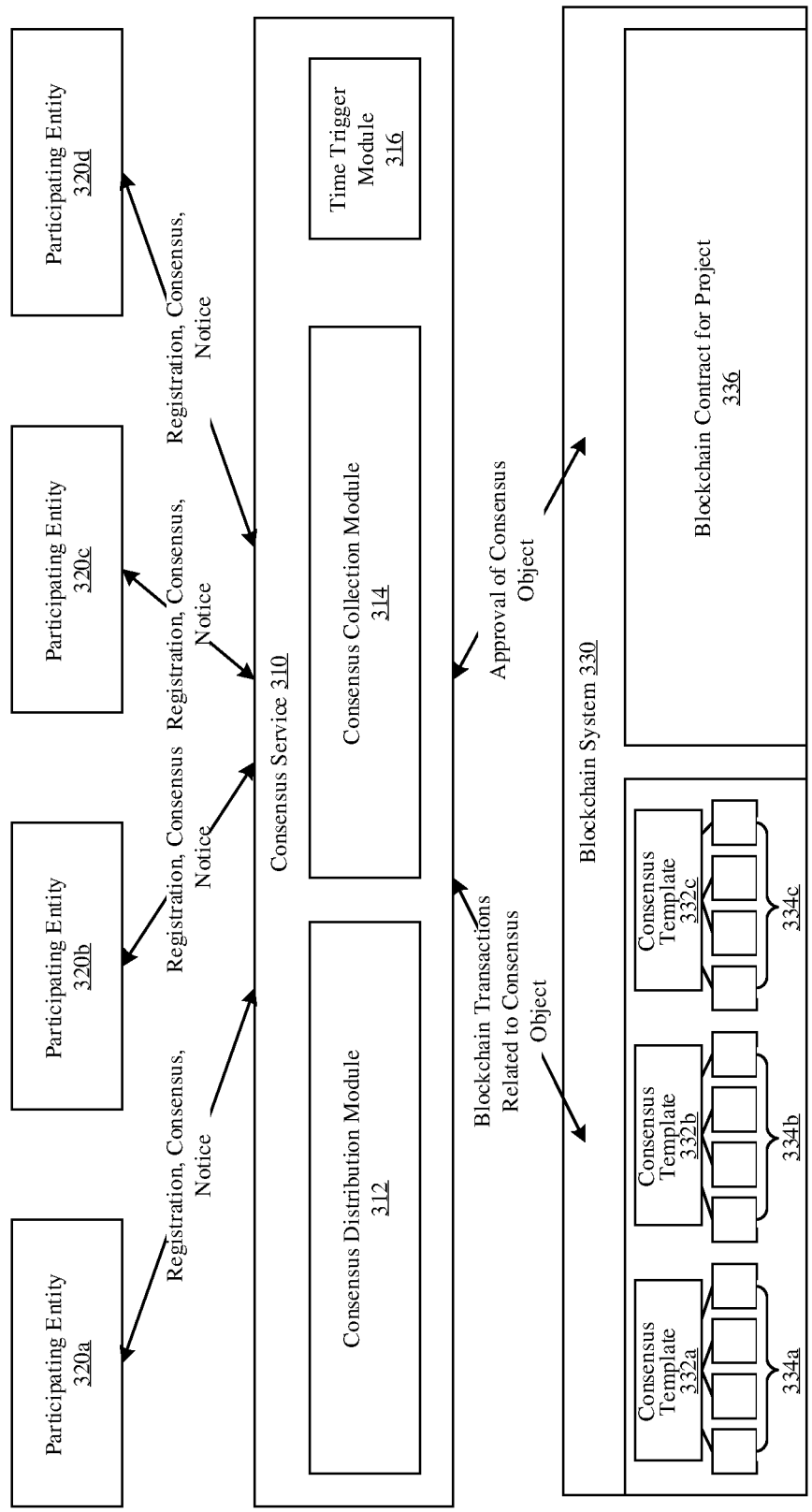
FIG. 3 illustrates a network environment for managing consensus among a plurality of participating entities in accordance with some embodiments.

FIG. 3 illustrates a network environment for managing consensus among a plurality of participating entities in accordance with some embodiments. In some embodiments, the network environment may comprise a consensus service 310. The consensus service 310 may be implemented on one or more computing systems comprising one or more suitable computing devices (e.g., servers, databases), which are collectively and individually referred to herein as the consensus service 310. In some embodiments, the consensus service 310 may comprise one or more software or hardware modules, such as, a consensus distribution module 312, a consensus collection module 314, a time trigger module 316, other suitable modules, or any combination thereof. The consensus distribution module 312 may provide various information associated with consensus templates or consensus objects. For example, the consensus distribution module 312 may provide information associated with a consensus object to a participating entity 320 and prompt the participating entity 320 to approve the consensus object. The consensus collection module 314 may collect various inputs from the participating entities 320 for one or more consensus objects. For example, the consensus collection module 314 may receive an approval message associated with a consensus object from a participating entity and register the approval in relation to the consensus object. In some embodiments, the consensus service 310 may determine that a participating entity 320 approves a consensus object if the participating entity 320 does not provide an input within a preset period of time. The time trigger module 316 may be configured to track the amount of time since the creation of a consensus object and to trigger one or more operations related to the consensus object after the lapse of a preset period of time. In some embodiments, the consensus service 310 may be implemented at least partially on the server end 118 as illustrated in FIGS. 1 and 2.

In some embodiments, the consensus service 310 may be connected to one or more computing systems associated with each of a plurality of participating entities via one or more networks. The participating entities connected to the consensus service 310 may comprise the participating entities 320a, 320b, 320c, and 320d as shown in FIG. 3 and one or more other suitable participating entities. Each of the participating entities 320 may comprise an individual, a company, an organization, another suitable entity, or any combination thereof. Herein, an entity and its corresponding computing systems may be referred to individually or collectively as a participating entity 320. In some embodiments, a computing system associated with a participating entity 320 may comprise one or more client-side applications configured to provide one or more interfaces to the consensus service 310 and to execute one or more functionalities associated with the consensus service 310.

In some embodiments, the consensus service 310 may be connected to a blockchain system 330. The blockchain system 330 may comprise one or more blockchain networks each being configured to store and manage a blockchain. The blockchain system 330 may comprise a plurality of blockchain nodes that are implemented on suitable computing systems. One or more of the blockchain nodes may be implemented as part of the consensus service 310. In some embodiments, the blockchain system 330 may be implemented at least partially as one or more of the blockchain systems 111, 112, 113, and 114 as illustrated in FIGS. 1 and 2. In some embodiments, the consensus service 310 may comprise one or more interfaces of the blockchain system 330. The one or more interfaces may be implemented on one or more blockchain nodes associated with the consensus service 310. In some embodiments, the blockchain associated with the blockchain system 330 may comprise one or more blockchain contracts for consensus management. One or more consensus templates (e.g., 332a, 332b, 332c) may be registered on the blockchain by invoking one or more of the blockchain contracts. One or more consensus objects (e.g., 334a, 334b, 334c) may be registered in association with one or more of the consensus templates on the blockchain. In some embodiments, the blockchain may also comprise one or more blockchain contracts 336 associated with one or more projects. Execution of one or more of the blockchain contracts 336 may be triggered by status information of one or more of the consensus objects.

In some embodiments, the consensus service 310 may exchange inputs, outputs, messages, notifications, data, or other suitable information with one or more of the participating entities 320. As an example, the consensus service 310 may receive one or more requests for registering one or more consensus templates 332 or one or more consensus objects 334 from one or more of the participating entities 320. As another example, the consensus service 310 may receive one or more messages approving one or more consensus objects 334 from one or more of the participating entities 320. As yet another example, the consensus service 310 may send one or more notices informing one or more of the participating entities 320 that consensus has been achieved with respect to a consensus object 334.

In some embodiments, the consensus service 310 may interface with the blockchain associated with the blockchain system 330 in one or more ways. As an example, the consensus service 310 may generate one or more blockchain transactions and add the one or more blockchain transactions to the blockchain. As another example, the consensus service 310 may obtain information associated with one or more consensus objects 334 from the blockchain system 330 and determine a status associated with each of the consensus object 334 based on the obtained information. The consensus service 310 may provide a proof of approval of a consensus object 334 to one or more blockchain contracts 336.

One or more components (e.g., the consensus service 310) of the network environment illustrated in FIG. 3 may execute, operate, or carry out one or more of the processes or methods as illustrated in FIGS. 4, 7, 9, 11, and 13-17.

Figure 4:
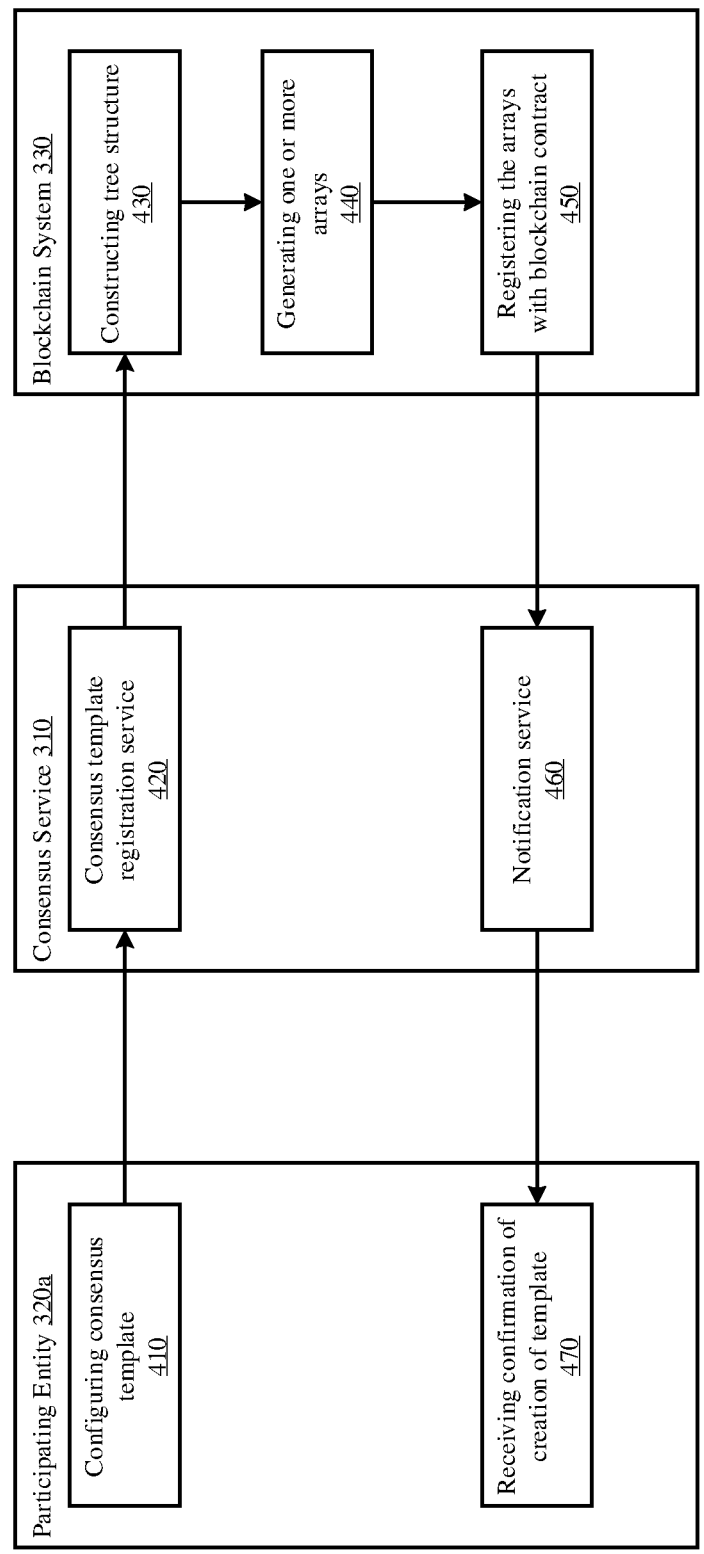
FIG. 4 illustrates a process for registering a consensus template in accordance with some embodiments.

FIG. 4 illustrates a process for registering a consensus template in accordance with some embodiments. Various steps of the process may be performed by an example participating entity 320a, the consensus service 310, and the blockchain system 330. Depending on the implementation, the process shown in FIG. 4 may include additional, fewer, or alternative steps performed in various orders or in parallel. The process may begin at step 410, where a participating entity 320a may configure a consensus template. The consensus template may correspond to a certain scenario in which a consensus is needed among multiple participating entities 320. For the scenario, a hierarchical structure of the participating entities and the requirements for accomplishing consensus may have been identified. The consensus template may be created to encode such information about the scenario. To create the consensus template, the participating entity 320a may send information associated with the consensus template to consensus service 310.

At step 420, the consensus service 310 may obtain a request for creating a consensus template. The request may comprise information about a plurality of participating entities associated with the consensus template. In some embodiments, the request may comprise a JavaScript Object Notation (JSON) file that describes information associated with the consensus template. In other embodiments, the request may be in other suitable documents or data formats. In some embodiments, the request may be obtained from a computing device associated with one of the participating entities 320 associated with the consensus template. For example, the participating entities 320a that sends the request may be one of the participating entities 320 for the consensus template. In other embodiments, the request for creating the consensus template may be received from an entity that does not participate in a consensus process associated with the consensus template. In some embodiments, the request may invoke a consensus template registration service provided by the consensus service 310. The consensus template registration service may be implemented by one or more software or hardware components associated with the consensus service 310.

In some embodiments, the information about the plurality of participating entities that is included in the request for creating the consensus template may comprise an identifier associated with each of one or more of the participating entities, a public key of a blockchain account associated with each of one or more of the participating entities, contact information associated with each of one or more of the participating entities, information associated with the hierarchical structure of the participating entities, a weight assigned to each of one or more of the participating entities, other suitable information, or any combination thereof. In some embodiments, the request for creating the consensus template may further comprise one or more criteria for determining achievement consensus. The criteria may comprise, for example, a number of participating entities required for achievement of consensus, an aggregated weight of the participating entities required for achievement of consensus, a required score that is calculated based on the participating entities that approve the consensus object and their respective weights in the hierarchical structure associated with the consensus template. The consensus service 310 may obtain the one or more criteria for determining achievement of consensus from the request for creating the consensus template and storing the one or more criteria.

In some embodiments, the consensus service 310 may generate, based on the request, a dataset representing a hierarchical structure of the participating entities associated with the consensus template. To generate the dataset, the consensus service 310 may parse the request for creating the consensus template to obtain a tree structure representing the hierarchical structure of the participating entities and generate one or more arrays corresponding to the tree structure.

Figure 5:
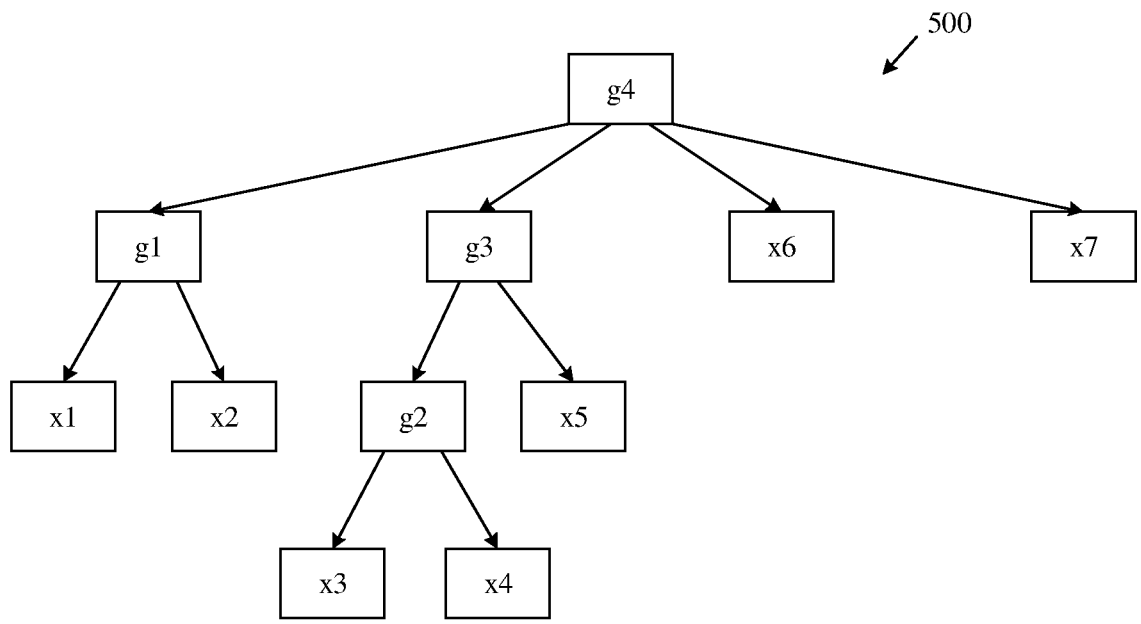
FIG. 5 illustrates a tree structure associated with a consensus template in accordance with some embodiments.

In some embodiments, at step 430, the consensus service 310 may construct a tree structure based on the request for creating the consensus template. FIG. 5 illustrates a tree structure 500 associated with a consensus template in accordance with some embodiments. Although illustrated in a tree-shaped graph in FIG. 5, the tree structure 500 may be constructed and stored in any suitable data format. The example tree structure 500 shown in FIG. 5 may comprise a plurality of nodes. The plurality of nodes may comprise a root node, one or more branch nodes, and a plurality of leaf nodes. For example, the node g4 may be a root node; the nodes g1, g2, and g3 may be branch nodes; the nodes x1, x2, x3, x4, x5, x6, x7 may be leaf nodes. In some embodiments, each leaf node may correspond to one of the participating entities associated with the consensus template. For example, the nodes x1-x7 may correspond to seven different individuals or entities participating in the consensus process corresponding to the consensus template. The root node and the branch nodes may encode a structure among the participating entities. The structure may represent, for example, employment relationships among entities, workflows associated with projects, logical requirements for consensus, other suitable relationships, or any combination thereof.

As an example, the branch node g2 may correspond to a company, for which two individuals respectively corresponding to leaf nodes x3 and x4 work. The node g2 may be a parent node of the nodes x3 and x4, and the nodes x3 and x4 may be child nodes of the node g2. If either the individual corresponding the leaf node x3 or the individual corresponding to the leaf node x4 approves a consensus object associated with this consensus template, it may indicate that the company corresponding to branch node g2 approves the consensus object. As another example, the branch node g3 may correspond to a step (e.g., product shipping) of a workflow (e.g., a process for manufacturing and selling a product) associated with the consensus template. The company corresponding to the branch node g2 and a company corresponding to the leaf node x5 may each be capable of completing the step corresponding to the branch node g3. The node g3 may be a parent node of the nodes g2 and x5, and the nodes g2 and x5 may be child nodes of the node g3. If either the company corresponding to the branch node g2 or the company corresponding to the leaf node x5 approves a consensus object associated with this consensus template, it may indicate that the step corresponding to the branch node g3 has been completed. As yet another example, the root node g4 may correspond to an overall status of a consensus object associated with the consensus template. The root node g4 may have four child nodes g1, g3, x6, and x7. The consensus object may have a status of being approved if a required number of the nodes g1, g3, x6, and x7, that are connected to the root node g4, show a status of approval. In some embodiments, each node in the tree structure 500 may be assigned a weight. A status of a parent node may depend on a status and weight of each of its child nodes. For example, a score may be registered to each of the nodes g1, g3, x6, and x7. A score associated with the node g4 may be calculated as a weighted sum of the scores of its child nodes. Whether the consensus object is approved may be determined based on the score associated with the node g4.

Figure 6:
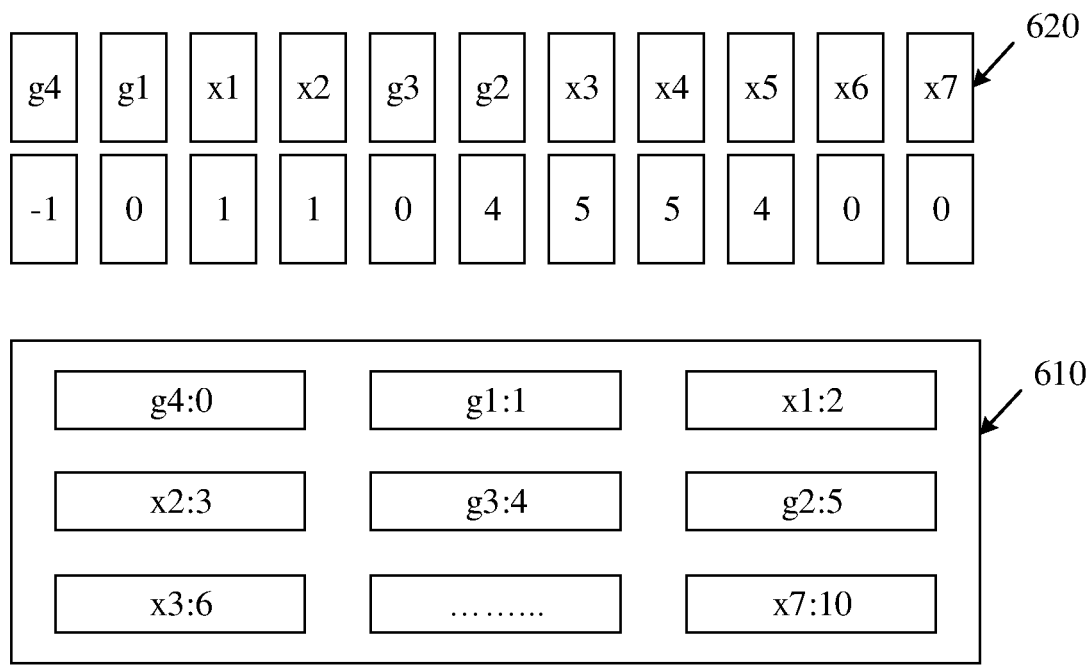
FIG. 6 illustrates data associated with a consensus template in accordance with some embodiments.

In some embodiments, at step 440 of FIG. 4, the consensus service 310 may generate one or more arrays corresponding to the tree structure. The one or more arrays may comprise an array comprising one or more serial numbers associated with one or more of the nodes of the tree structure, an array comprising one or more serial numbers associated with one or more parent nodes of the one or more of the nodes of the tree structure, or an array comprising the one or more weights respectively associated with the one or more of the nodes of the tree structure. FIG. 6 illustrates data associated with a consensus template in accordance with some embodiments. As an example, one or more arrays may be used to represent the dataset 610, which correspond an identifier of each of the nodes in the tree structure 500 (e.g., g4, g1, x1, x2, g3, g2, x3, x4, x5, x6, x7) to an index number (e.g., 0, 1, 2, 3, 4, 5, 6, 7, 8, 9, 10). As another example, one or more arrays may be used to represent the dataset 620, which indicates an index number for a parent node of each of nodes in the tree structure 500. For example, the node g4 in the tree structure does not have a parent node in the tree structure 500. A number −1 may be used as a placeholder in the parent field of the node g4. The parent node for the node g1 in the tree structure 500 is the node g4. Therefore, the parent field of the node g1 may include 0, which is the index number of the node g4. The parent node for the node x4 is the node g2. Therefore, the parent field of the node x4 may include 5, which is the index number of the node g2.

In some embodiments, the consensus service 310 may register the consensus template to the blockchain associated with the blockchain system 330. For example, at step 450 of FIG. 4, the consensus service 310 may register the arrays corresponding to the tree structure to a blockchain contract for consensus management on the blockchain. In some embodiments, the consensus service 310 may create a blockchain transaction for registering the consensus template to the blockchain. The blockchain transaction may comprises the dataset representing the hierarchical structure of the participating entities. In the example illustrated in FIG. 4, the dataset may comprise the arrays 610 and 620 as shown in FIG. 6. In some embodiments, the blockchain transaction for registering the consensus template to a blockchain may be executable to invoke a blockchain contract configured to register one or more consensus templates to the blockchain. Then, the consensus service 310 may send, to one or more blockchain nodes associated with the blockchain system 330 for adding to the blockchain, the blockchain transaction for registering the consensus template to the blockchain.

After registering the consensus template, the consensus service 310 may use a notification service 460 to return a confirmation for creation of the consensus template to the computing device associated with the participating entity 320a. At step 470, the participating entity 320a may receive the confirmation of creation of the consensus template.

Figure 7:
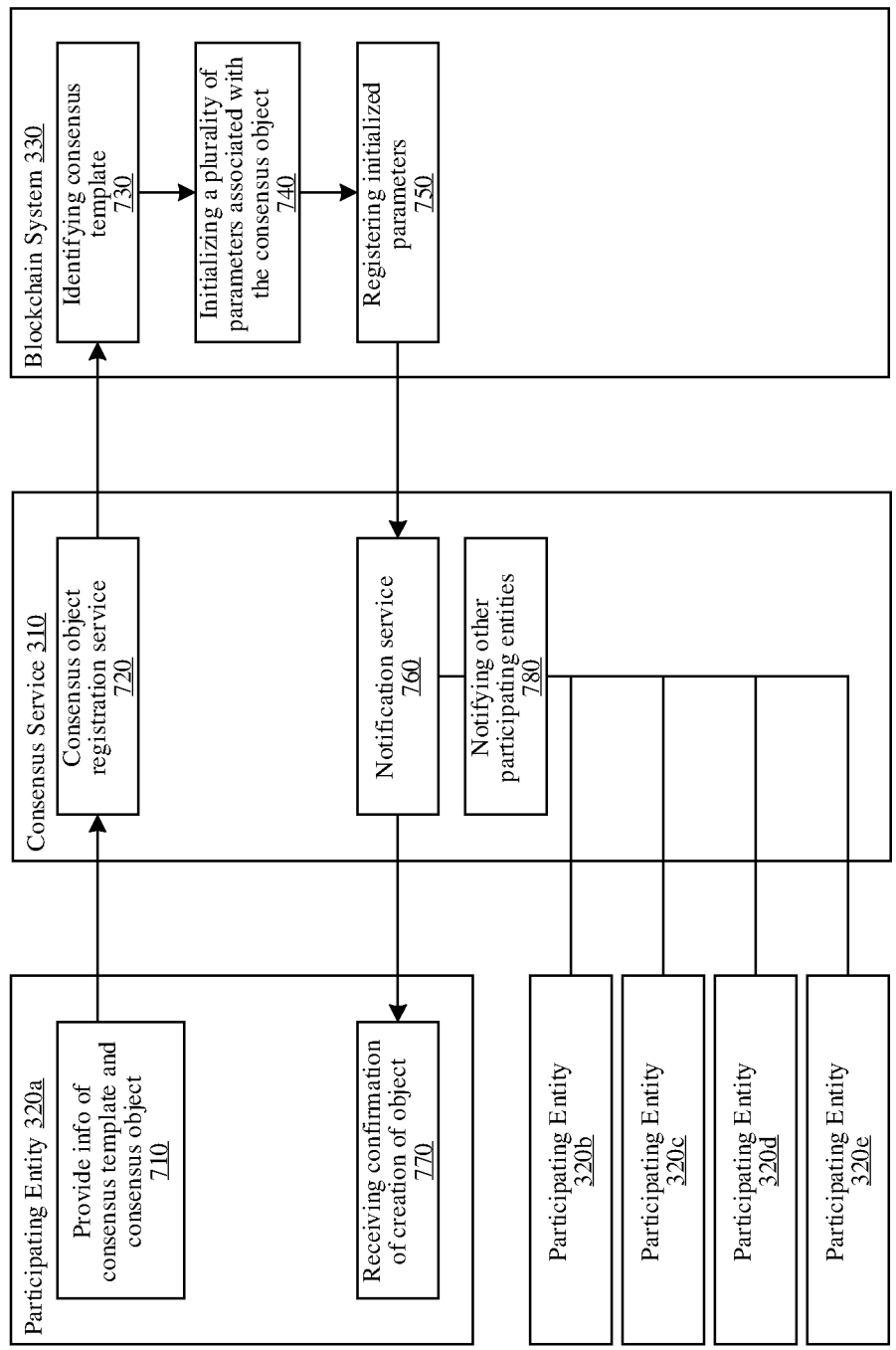
FIG. 7 illustrates a process for registering a consensus object in accordance with some embodiments.

FIG. 7 illustrates a process for registering a consensus object in accordance with some embodiments. Various steps of the process may be performed by an example participating entity 320a, one or more other participating entities 320b, 320c, 320d, and 320e, the consensus service 310, and the blockchain system 330. Depending on the implementation, the process shown in FIG. 7 may include additional, fewer, or alternative steps performed in various orders or in parallel. The process may begin at step 710, where the participating entity 320a may generate a request for creating a consensus object. In the request, the participating entity 320a may include information of a consensus template to be used for the consensus object and information of the consensus object to be created. For example, the request may comprise an identifier of the consensus template, an identifier of the consensus object to be created, an identifier associated with a blockchain contract for managing consensus templates or consensus objects, other suitable information, or any combination thereof. In some embodiments, the identifier of the consensus object may correspond to a project (e.g., product order) represented by the consensus object.

At step 720, the consensus service 310 may obtain a request for creating a consensus object from a computing system associated with an entity (e.g., 320a). The request may invoke a consensus object registration service associated with the consensus service 310. In some embodiments, the request may be obtained from a computing device associated with one of the participating entities 320 associated with the consensus template. For example, the participating entity 320a that sends the request may be one of the participating entities 320 for the consensus template. In other embodiments, the request for creating the consensus template may be received from an entity that does not participate in a consensus process associated with the consensus template. In some embodiments, the consensus object may require consensus of a plurality of participating entities 320. The consensus may be achieved based on a hierarchical structure of participating entities 320 that is encoded in the consensus template identified in the request.

At step 730, the consensus service 310 may identify, from the request for creating the consensus object, the consensus template to be used to create the consensus object. Then, at step 740, the consensus service 310 may initialize, based on the hierarchical structure of the participating entities associated with the consensus template, a plurality of parameters associated with the consensus object. The parameters may comprise a parameter corresponding to each of the participating entities. The consensus service may initialize the parameters by setting each of the parameters to an initial value. In some embodiments, the consensus service 310 may initialize the parameters by first obtaining a tree structure representing the hierarchical structure of the participating entities, the tree structure comprising a plurality of nodes. The consensus service may generate an array comprising a plurality of positions respectively corresponding to the parameters associated with the consensus object. Each of the positions may correspond to one of the nodes of the tree structure. Then, the consensus service 310 may set each of the positions of the array to the initial value for the parameter corresponding to the position. An example of the array is shown in FIG. 8.

Figure 8:
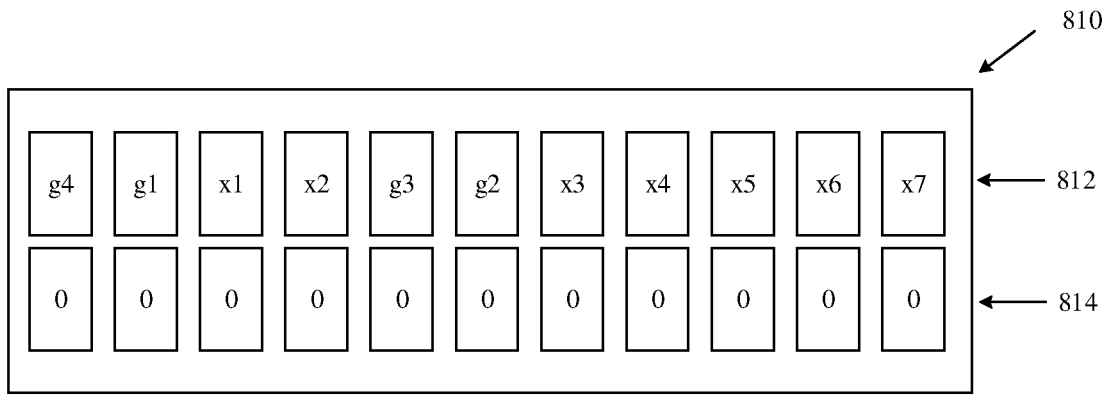
FIG. 8 illustrates data representing a plurality of parameters associated with a consensus object in accordance with some embodiments.

FIG. 8 illustrates data representing a plurality of parameters associated with a consensus object in accordance with some embodiments. The dataset 810 illustrated in FIG. 8 may comprise one or more arrays showing the correspondence between the parameters and the nodes of the tree structure 500. For example, the dataset 810 may comprise an array 812 of the identifiers of the nodes in the tree structure 500. The array may alternatively comprise the index numbers for the nodes. The dataset 810 may further comprise an array 814 comprising a plurality of values associated with the parameters. The value of the parameter for each node may be placed in a position in the array 814 that corresponds to the node. In this example, the parameters associated with the consensus object may be initialized to be 0. In other examples, the consensus service may initialize the parameters to any suitable preset values.

At step 750 of FIG. 7, the consensus service 310 may register the consensus object, including the initialized parameters, to the blockchain associated with the blockchain system 330. In some embodiments, the consensus service 310 may create a blockchain transaction for registering the consensus object to the blockchain. The blockchain transaction may comprise the initial value associated with each of the parameters. In addition to the initial values, the blockchain transaction may further comprise a plurality of properties of the consensus object. The properties may comprise an identifier of the consensus template, an identifier of the consensus object, an identifier associated with each of one or more of the participating entities, a public key of a blockchain account associated with each of one or more of the participating entities, a weight assigned to each of one or more of the participating entities, other suitable properties, or any combination thereof. Then, the consensus service 310 may send, to one or more blockchain nodes associated with the blockchain system 330 for adding to the blockchain, the blockchain transaction for registering the consensus object to the blockchain. The blockchain transaction may be executable by the blockchain system 330 to invoke the blockchain contract for registering consensus objects.

After registering the consensus object, at step 760, the consensus service 310 may return a confirmation for creation of the consensus object to the computing device associated with the one of the participating entities 320a. The confirmation may be generated and sent by a notification service associated with the consensus service 310. At step 770, the participating entity 320a may receive the confirmation that the consensus object has been created.

In some embodiments, at step 780, the consensus service 310 may send, to one or more computing devices associated with one or more of the participating entities (e.g., 320b, 320c, 320d, 320e) associated with the consensus object, a notification for creation of the consensus object. The notification may comprise an identifier of the consensus object and a request for approval of the consensus object. The notifications may be sent based on contact information (e.g., network addresses) included in the request from the participating entity 320a or in information associated with the consensus template.

Figure 9:
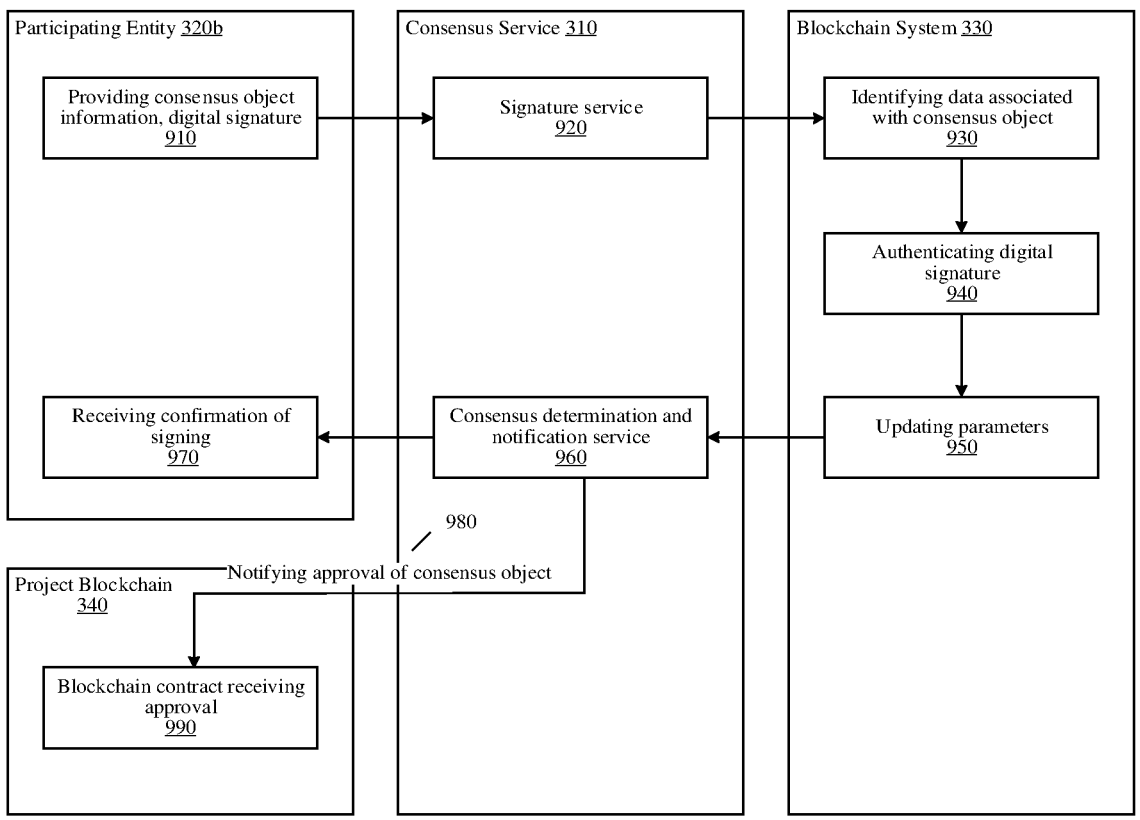
FIG. 9 illustrates a process for registering approval for a consensus object in accordance with some embodiments.

FIG. 9 illustrates a process for registering approval for a consensus object in accordance with some embodiments. Various steps of the process may be performed by an example participating entity 320b, the consensus service 310, and the blockchain system 330. Depending on the implementation, the process shown in FIG. 9 may include additional, fewer, or alternative steps performed in various orders or in parallel. The process may begin at step 910, where the participating entity 320b may generate an approval message for a consensus object associated with a consensus template. The consensus object may have been registered with the blockchain associated with the blockchain system 330. In some embodiments, the participating entity 320b may approve the consensus object after, for example, it has completed a step associated with a workflow corresponding to the consensus object or when it has verified one or more facts about the consensus object. The participating entity 320b may include information associated with the consensus object (e.g., an identifier of the consensus object) and information proving the identity or authority of the participating entity 320b in the approval message. After generating the approval message, the participating entity 320b may send the approval message to the consensus service 310.

At step 920, the consensus service 310 may obtain the approval message for the consensus object. The approval message may invoke a signature service associated with the consensus service. The consensus object may comprise a plurality of parameters associated with a hierarchical structure of a plurality of participating entities 320 that is encoded in the consensus template. The approval message may comprise information associated with the participating entity 320b, which is one of the participating entities associated with the consensus template. There may be one or more parameters of the consensus object that are related to the participating entity 320b. For example, the node x1 in the tree structure 500 and its corresponding parameter in the array 814 may be associated with the participating entity 320b. The consensus service 310 may further obtain, based on the approval message, a digital signature associated with the one of the participating entities. In some embodiments, the consensus service 310 may obtain the digital signature from the approval message for the consensus object. In other embodiments, the signature service may be configured to safekeep cryptographic keys associated with one or more participating entities 320 and use the cryptographic keys to generate the digital signature. For example, the consensus service 310 may obtain identity information associated with the one of the participating entities from the approval message for the consensus object, authenticate the identity information associated with the one of the participating entities, retrieve, based on the obtained identity information, a private key associated with the one of the participating entities, and generate the digital signature based on the private key associated with the one of the participating entities.

At step 930, the consensus service 310 may identify data associated with the consensus object. In some embodiments, the consensus service 310 may obtain information associated with the consensus object or its corresponding consensus template from the blockchain associated with the blockchain system 330. The information associated with the consensus object may be obtained based on an identifier of the consensus object that is included in the approval message from the participating entity 320b. Among the information associated with the consensus object may be one or more public keys or other credential information associated with the participating entities of the consensus object.

At step 940, the consensus service 310 may authenticate the digital signature based on information associated with the consensus object. In some embodiments, the consensus service 310 may obtain a public key associated with the one of the participating entities (e.g., the participating entity 320b) from information associated with the consensus object and verify, based on the public key, that the digital signature is created based on a private key corresponding to the public key.

If the digital signature from the participating entity 320b is authenticated, the consensus service may update one or more parameters associated with the consensus object at step 950. In some embodiments, the consensus service 310 may create, based on the approval message, a blockchain transaction executable to set the parameter corresponding to the one of the participating entities (e.g., the participating entity 320b) to an updated value. Then, the consensus service 310 may send the blockchain transaction to one or more blockchain nodes associated with the blockchain system 330 for adding to the blockchain. The blockchain transaction may be further executable to set one or more other parameters associated with the consensus object to one or more updated values, respectively. Each of the other parameters may have a dependency relationship with the parameter corresponding to the one of the participating entities. In some embodiments, the blockchain transaction may be executable to invoke a blockchain contract configured to maintain values of the parameters associated with the consensus object.

In some embodiments, the consensus service 310 may determine the parameters to update based on the tree structure 500 associated with the consensus template. The consensus service 310 may obtain the tree structure 500 representing the hierarchical structure of the participating entities. The tree structure may comprise a plurality of nodes. The nodes of the tree structure may respectively correspond to the parameters associated with the consensus object. The consensus service 310 may identify, from the tree structure, one or more other nodes in a branch connecting the node corresponding to the parameter of the one of the participating entities to a root node of the tree structure and determine an updated value for each of the other nodes and the root node. In some embodiments, the consensus service may determine the updated value of each other node to be a weighted sum of one or more values associated with one or more child nodes of the other node. For example, the participating entity 320b may correspond to the node x1 in the tree structure 500. The consensus service 310 may identify that the node g1 is in a branch connecting the node x1 to the root node g4. It may update the parameters associated with the nodes x1, g1, and g4.

Figure 10:
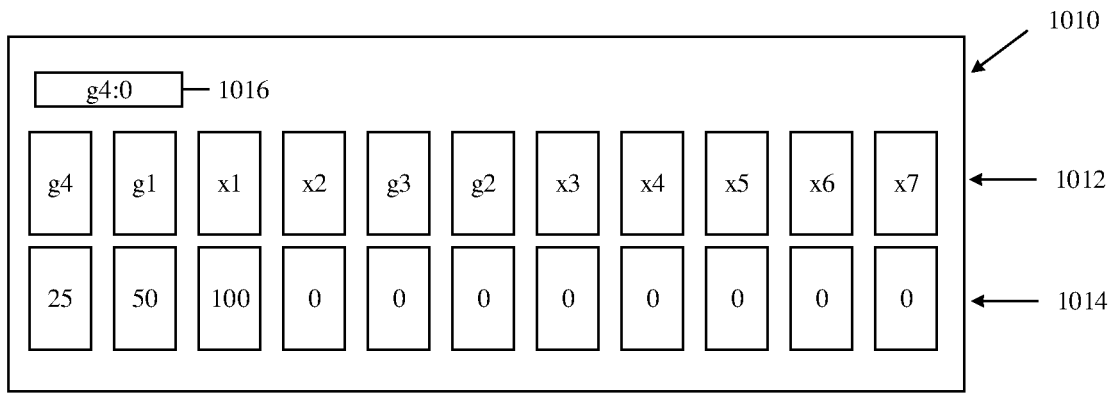
FIG. 10 illustrates data representing a plurality of parameters associated with a consensus object in accordance with some embodiments.

Based on the approval message from the participating entity 320b, the consensus service 310 may update the parameter for x1 to be 100. The parameter for the node g1 may be calculated as a weighted sum of the parameters for the nodes x1 and x2. Assuming that x1 and x2 each has a weight of 0.5 and the current value of the parameter for x2 is 0, the parameter corresponding to the node g1 may be updated to be 50. The parameter for the node g4 may be calculated as a weighted sum of the parameters for the nodes g1, g3, x6 and x7. In this example, the parameter for the node g4 may be updated to 25. These example updates to the parameters are shown in the data fields 1010 in FIG. 10. FIG. 10 illustrates data representing a plurality of parameters associated with a consensus object in accordance with some embodiments. It may comprise an array 1012 comprising identifiers of the nodes in the tree structure 500, an array 1014 comprising updated parameter values associated with the nodes, and a field 1016 indicating an index number associated with the root node g4.

In some embodiments, the consensus service 310 may generate a confirmation for successful signing of the consensus object and return the confirmation to the participating entity 320b at step 960 of FIG. 9. In some embodiments, the consensus service 310 may further determine whether consensus has been achieved with respect to the consensus object at step 960. For example, the consensus service 310 may obtain, from the blockchain, one or more updated values of one or more of the parameters associated with the consensus object, determine, based on the one or more updated values, whether one or more criteria for determining approval of the consensus object are satisfied. The one or more criteria may comprise a required number of participating entities approving the consensus object or one or more required participating entities approving the consensus object. If the one or more criteria are satisfied, the consensus service 310 may determine that consensus has been achieved and include a proof of approval of the consensus object in the notification to the participating entity 320b. At step 970, the participating entity 320b may receive the confirmation for successful signing of the consensus object from the consensus service 310.

In some embodiments, if the consensus service 310 determine that the consensus object has been approved by the participating entities 320, it may trigger one or more events contingent upon on the approval of the consensus object. In some embodiments, the consensus service 310 may communicate the approval of the consensus object to one or more other systems (e.g., computing systems associated with one or more other participating entities 320). In other embodiments, the consensus service 310 may cause one or more blockchain operations based on approval of the consensus object. For example, the consensus service 310 may generate a blockchain transaction comprising a proof of the approval of the consensus object. The consensus service 310 may send the blockchain transaction to one or more blockchain nodes associated with the blockchain system 330 for adding to the blockchain that registers the consensus template and the consensus object. Alternatively, the consensus service 310 may send the blockchain transaction to one or more blockchain nodes associated with a different blockchain for adding to the different blockchain at step 980. The different blockchain may comprise one or more blockchain contracts for executing a project associated with the consensus object. The blockchain transaction comprising the proof of the approval of the consensus object may be executable to invoke one or more of the blockchain contracts. After receiving the blockchain transaction at step 990, the one or more blockchain nodes associated with the different blockchain may execute one or more blockchain contracts to trigger one or more blockchain transactions based on the approval of the consensus object. One or more steps associated with the workflow may be automatically carried out based on the proof of approval of the consensus object. For example, for a workflow associated with a product order, approval of a corresponding consensus object may indicate fulfillment of the order. The blockchain contract may be invoked to issue a payment in response to the fulfillment of the order.

Figure 11:
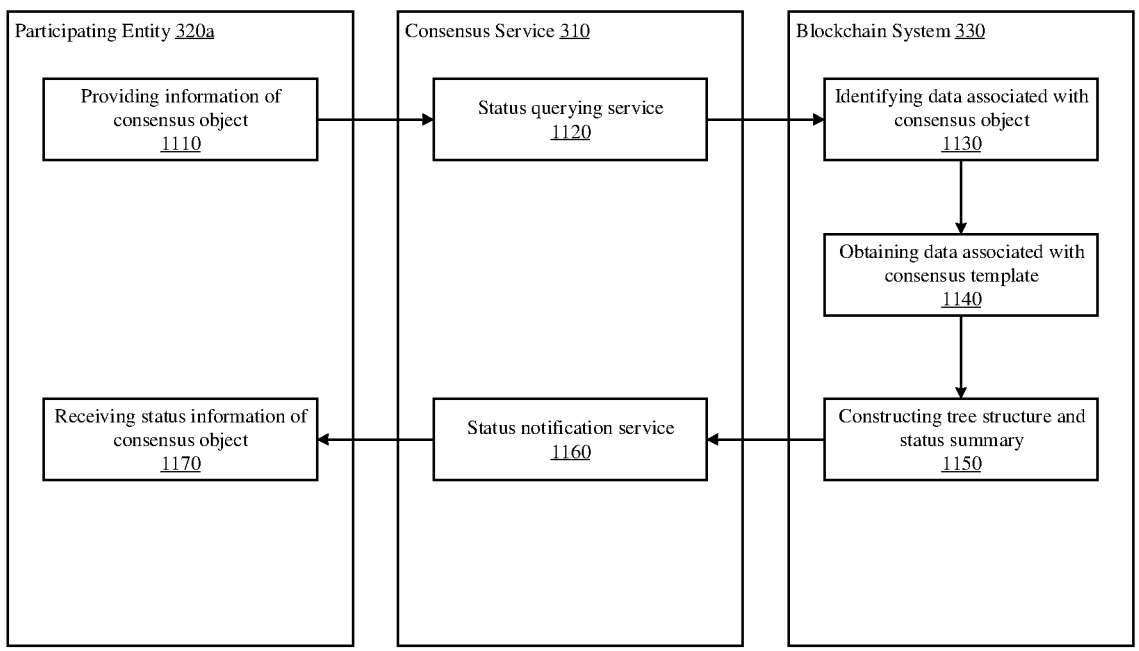
FIG. 11 illustrates a process for providing status information of a consensus object in accordance with some embodiments.

FIG. 11 illustrates a process for providing status information of a consensus object in accordance with some embodiments. Various steps of the process may be performed by an example participating entity 320a, the consensus service 310, and the blockchain system 330. Depending on the implementation, the process shown in FIG. 11 may include additional, fewer, or alternative steps performed in various orders or in parallel. The process may begin at step 1110, where the participating entity 320a may generate a request for a status of a consensus object. The request may comprise information of the inquired consensus object such as an identifier of the consensus object. The participating entity 320a may send the request to the consensus service 310.

At step 1120, the consensus service 310 may obtain the request for the status of the consensus object associated with a blockchain. As described above, the consensus object may comprise a plurality of parameters associated with a hierarchical structure of a plurality of participating entities 320. The participating entities 320 associated with the consensus object may or may not include the participating entity 320a that requests for the status of the consensus object.

At step 1130, the consensus service 310 may identify data associated with the consensus object from the blockchain. The consensus service 310 may identify the data based on identification information associated with the consensus object. The consensus service 310 may then obtain, from the blockchain, a plurality of values respectively associated with the parameters of the consensus object. At step 1140, the consensus service 310 may further obtain data associated with the consensus template corresponding to the consensus object. The data may comprise information associated with a hierarchical structure of the participating entities 320.

At step 1150, the consensus service 310 may generate a status summary of the consensus object based on the plurality of values associated with its parameters. In some embodiments, the status summary of the consensus object may comprise a JavaScript Object Notation (JSON) file. In some embodiments, the status summary of the consensus object may comprise a proof of approval of the consensus object. In some embodiments, the status summary of the consensus object may comprise identity information associated with each of one or more of the participating entities that have approved the consensus object, a digital signature associated with each of the one or more of the participating entities that have approved the consensus object, a weight assigned to each of the one or more of the participating entities that have approved the consensus object, other suitable information, or any combination thereof.

Figure 12:
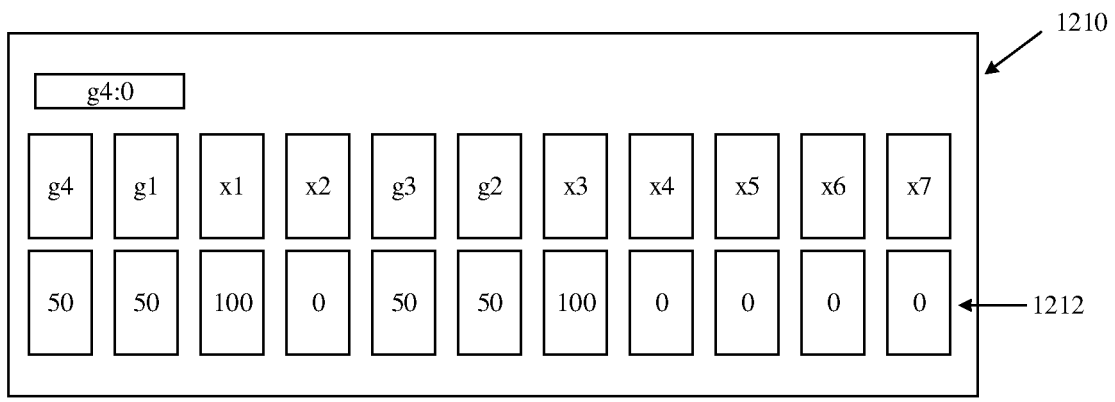
FIG. 12 illustrates data representing a plurality of parameters associated with a consensus object in accordance with some embodiments.

In some embodiments, at step 1150, the consensus service 310 may construct a tree structure corresponding to the hierarchical structure of the participating entities based on information associated with the consensus object and generate the status summary of the consensus object based on the tree structure. The tree structure may comprise a plurality of nodes. The plurality of nodes may comprise a root node, one or more branch nodes, and a plurality of leaf nodes. Each of the nodes of the tree structure may correspond to one of the plurality of parameters associated with the consensus object. The status summary may comprise a value of the parameter corresponding to the root node of the tree structure. If the value of the parameter corresponding to the root node of the tree structure exceeds a preset threshold, it may be determined that consensus has been achieved with respect to the consensus object. Otherwise, it may be determined that consensus has not been achieved. The status summary may further comprise a value of the parameter corresponding to each of the nodes of the tree structure. In some embodiments, the information associated with the consensus object may comprise an array of a plurality of entries respectively corresponding to the parameters of the consensus object. An example of such an array is shown in FIG. 12 described below. At step 1160, the consensus service 310 may generate a notification comprising the status summary of the consensus object and return send the notification to the participating entity 320*a*. At step 1170, the participating entity 320*a* may receive the status information of the consensus object.

FIG. 12 illustrates data representing a plurality of parameters associated with a consensus object in accordance with some embodiments. A dataset 1210 shown in FIG. 12 may be an array 1212 comprising a plurality of entries respectively corresponding to the parameters of the consensus object. The consensus service 310 may construct the tree structure by organizing the array of entries according to the hierarchical structure of the participating entities. The consensus service 310 may obtain information associated with the hierarchical structure of the participating entities from, for example, the data sets 610 and 620 shown in FIG. 6, which may be stored in association with the consensus template corresponding to the consensus object. In some embodiments, to construct the tree structure, the consensus service 310 may create a stack for containing one or more of the entries in the array. Then, for each of the entries in the array, the consensus service 310 may obtain the entry from the array, update the stack based on the obtained entry, and add the obtained entry to the tree structure. A position of the obtained entry in the tree structure may be based on the updated stack. In some embodiments, the consensus service 310 may add the obtained entry to the stack or remove one or more entries from the stack. In some embodiments, to construct the tree structure, the consensus service 310 may further create one or more indices associated with the tree structure, update the one or more indices based on the each obtained entry, and update the stack based further on the one or more updated indices. An example method for constructing the tree structure based on the array of entries is described with respect to FIG. 13.

Figure 13:
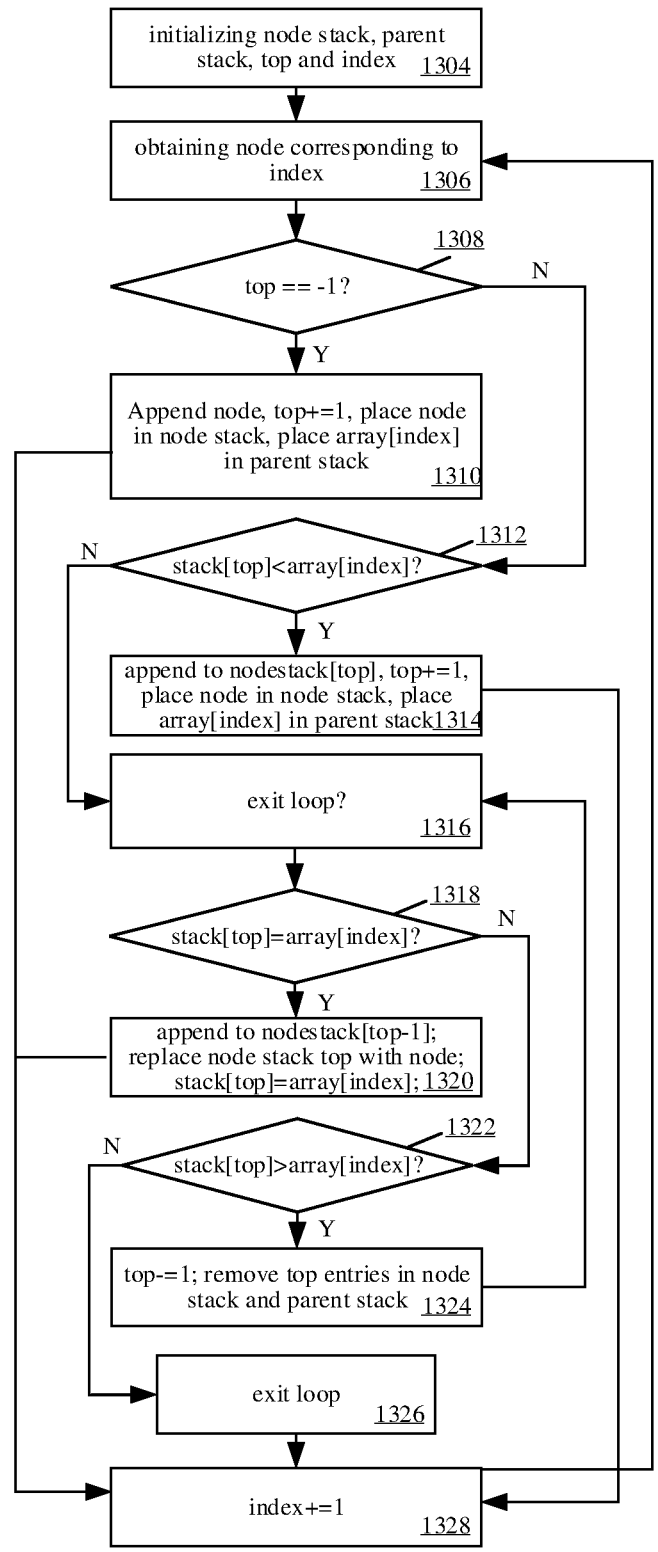
FIG. 13 illustrates a method for constructing a tree structure based on data associated with a consensus template and a consensus object in accordance with some embodiments.

FIG. 13 illustrates a method for constructing a tree structure based on data associated with a consensus template and a consensus object in accordance with some embodiments. Depending on the implementation, the method shown in FIG. 13 may include additional, fewer, or alternative steps performed in various orders or in parallel. At step 1304, the consensus service 310 may initialize various data entries for construction of the tree structure. For example, it may initialize a node stack, a parent stack, a variable "top," and a variable "index." The node stack may hold one or more identifiers of one or more nodes associated with a tree structure (e.g., the identifiers in the dataset 620). The parent stack may hold one or more index numbers for the parents nodes associated with one or more nodes (e.g., the parent index numbers in the dataset 620). The "top" variable may record a position of an entry on the top of the node stack or the parent stack. The "index" variable may record an index number of a node currently of interest. Example values of the "index" variable may include the index numbers in the dataset 610. The node stack and the parent stack may be initialized to be empty. The "top" variable may be initialized to −1. The "index" variable may be initialized to 0. The consensus service 310 may further construct the tree structure based on the dataset 620, which corresponds to the nodes with their parent nodes' index numbers. The consensus service may use an array of the parent nodes' index numbers. Although FIG. 13 illustrates using the stack data structure, this disclosure contemplates using other suitable data structures to construct the tree structure.

At step 1306, the consensus service 310 may obtain a node corresponding to an index number equal to the "index" variable. For example, when the "index" variable has the value 0, the consensus service 310 may obtain the node g4 based on the dataset 610 that is encoded in the consensus template.

At step 1308, the consensus service 310 may determine whether the "top" variable has the value −1. If so, it may proceed to step 1310. Otherwise, it may proceed to step 1312.

At step 1310, the consensus service 310 may position the obtained node as the root node of the tree structure. For example, the consensus service 310 may use the node g4 as the root node of the tree structure. Then, the consensus service 310 may increment the "top" variable by 1, place the node with an index number equal to the "top" variable in the node stack, and place the index number at the position equal to the "index" variable in the array of the parent nodes' index numbers (denoted "array[index]") in the parent stack. For example, with an original value of the "top" variable being −1 and an original value of the "index" variable being 0, the consensus service may increment the "top" variable to 0, place the node g4 in the node stack, and place the index number −1 in the parent stack. Then, the consensus service 310 may proceed to the step 1328.

At step 1328, the consensus service 310 may increment the "index" variable by 1 (e.g., when the original "index" variable is 0, increment it to 1). Then, the consensus service 310 may return to the step 1306, wherein it may obtain a node corresponding to an index number equal to the updated "index" variable. For example, when the "index" variable is incremented to 1, the consensus service may obtain the node g1. Then, the consensus service 310 may proceed to step 1308, where it may determine whether the "top" variable has the value −1. For example, if the "top" variable has been updated to 0, the consensus service 310 may proceed to step 1312.

At step 1312, the consensus service 310 may determine whether the value in the parent stack that has the position equal to the "top" variable (denoted "stack[top]") is smaller than the value in the array of parent nodes' index numbers that has the position equal to the "index" variable [denoted "array[index]"]. For example, when the "top" variable equals 0 and the "index" variable equals 1, stack[top] equals −1 and array[index] equals 0. In this case, the condition stack[top]<array[index] evaluates to true and the consensus service 310 may proceed to step 1314. If the condition stack[top]<array[index] evaluates to false, the consensus service 310 may proceed to step 1316.

At step 1314, the consensus service 310 may append, in the tree structure, the obtained node to the node at the position equal to the "top" variable in the node stack (denoted "nodestack[top]"). For example, if the "top" variable evaluates to 0, nodestack[top] may be g4. The consensus service may append the node g1 to the node g4 in the tree structure. At step 1314, the consensus service 310 may further increment the "top" variable by 1, place the obtained node in the node stack, and place array[index] in the parent stack. For example, the consensus service 310 may place the node g1 in the node stack and the index number 0 in the parent stack. Then, the consensus service 310 may proceed to step 1328.

At step 1316, the consensus service 310 may proceed to step 1318. At step 1318, the consensus service 310 may determine whether the value in the parent stack that has the position equal to the "top" variable (denoted "stack[top]") is the same as the value in the array of parent nodes' index numbers that has the position equal to the "index" variable [denoted "array[index]"]. If so, the consensus service 310 may proceed to step 1320. If not, the consensus service 310 may proceed to step 1322.

At step 1320, the consensus service 310 may append, in the tree structure, the obtained node to the node at the position equal to the "top" variable minus 1 in the node stack (denoted "nodestack[top-1]"). At step 1320, the consensus service 310 may further replace the node on the top of the node stack with the obtained node and keep stack[top] equal to array[index] in the parent stack.

At step 1322, the consensus service 310 may determine whether the value in the parent stack that has the position equal to the "top" variable (denoted "stack[top]") is greater than the value in the array of parent nodes' index numbers that has the position equal to the "index" variable [denoted "array[index]"]. If so, the consensus service 310 may proceed to step 1324. If not, the consensus service 310 may proceed to step 1326.

At step 1324, the consensus service 310 may decrement the "top" variable by 1 and remove the top entries in the node stack and the parent stack. Then the consensus service 310 may return to the step 1316. At step 1326, the consensus service 310 may proceed to step 1328.

The steps in the method shown in FIG. 13 may be executed recursively until all the nodes in the data associated with the consensus template or consensus object are exhausted, that is when there is no node corresponding to the index number equal to the "index" variable when the consensus service 310 attempts to obtain the node at step 1306.

Figure 14:
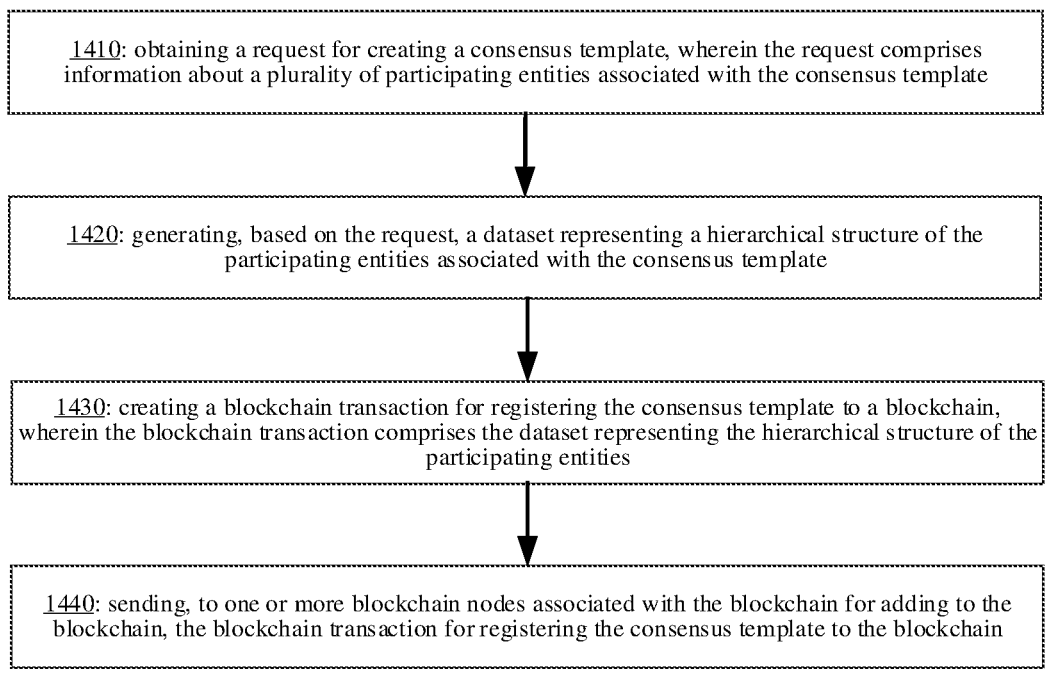
FIG. 14 illustrates a method for registering a consensus template in accordance with some embodiments.

FIG. 14 illustrates a method for registering a consensus template in accordance with some embodiments. The method 1400 may be performed by a device, apparatus, or system for blockchain-based consensus management. The method 1400 may be performed by one or more components of the environment or system illustrated by FIGS. 1-3, such as one or more components of the consensus service 310 in FIG. 3. Depending on the implementation, the method 1400 may include additional, fewer, or alternative steps performed in various orders or in parallel.

Block 1410 includes obtaining a request for creating a consensus template, wherein the request comprises information about a plurality of participating entities associated with the consensus template. In some embodiments, the information about the plurality of participating entities comprises: an identifier associated with each of one or more of the participating entities; a public key of a blockchain account associated with each of one or more of the participating entities; contact information associated with each of one or more of the participating entities; information associated with the hierarchical structure of the participating entities; or a weight assigned to each of one or more of the participating entities. In some embodiments, the request for creating the consensus template comprises a JavaScript Object Notation (JSON) file.

Block 1420 includes generating, based on the request, a dataset representing a hierarchical structure of the participating entities associated with the consensus template. In some embodiments, the generating a dataset representing a hierarchical structure of the participating entities associated with the consensus template comprises: parsing the request for creating the consensus template to obtain a tree structure representing the hierarchical structure of the participating entities; and generating one or more arrays corresponding to the tree structure. In some embodiments, the tree structure comprises a plurality of nodes, the plurality of nodes comprising a root node, one or more branch nodes, and a plurality of leaf nodes. The tree structure comprises one or more weights respectively associated with one or more of the nodes of the tree structure. Each of the leaf nodes corresponds to one of the participating entities associated with the consensus template. In some embodiments, one or more of the leaf nodes each corresponds to an individual associated with an entity. A parent node of the one or more of the leaf nodes corresponds to the entity. In some embodiments, the one or more arrays comprise: an array comprising one or more serial numbers associated with one or more of the nodes of the tree structure; an array comprising one or more serial numbers associated with one or more parent nodes of the one or more of the nodes of the tree structure; or an array comprising the one or more weights respectively associated with the one or more of the nodes of the tree structure.

Block 1430 includes creating a blockchain transaction for registering the consensus template to a blockchain, wherein the blockchain transaction comprises the dataset representing the hierarchical structure of the participating entities. In some embodiments, the blockchain transaction for registering the consensus template to a blockchain is executable to invoke a blockchain contract configured to register one or more consensus templates to the blockchain.

Block 1440 includes sending, to one or more blockchain nodes associated with the blockchain for adding to the blockchain, the blockchain transaction for registering the consensus template to the blockchain.

In some embodiments, the method further comprises: obtaining, from the request for creating the consensus template, one or more criteria for determining achievement of consensus; and storing the one or more criteria for determining achievement of consensus.

In some embodiments, the obtaining a request for creating a consensus template comprises obtaining the request for creating the consensus template from a computing device associated with one of the participating entities associated with the consensus template. The method further comprises returning a confirmation for creation of the consensus template to the computing device associated with the one of the participating entities.

Figure 15:
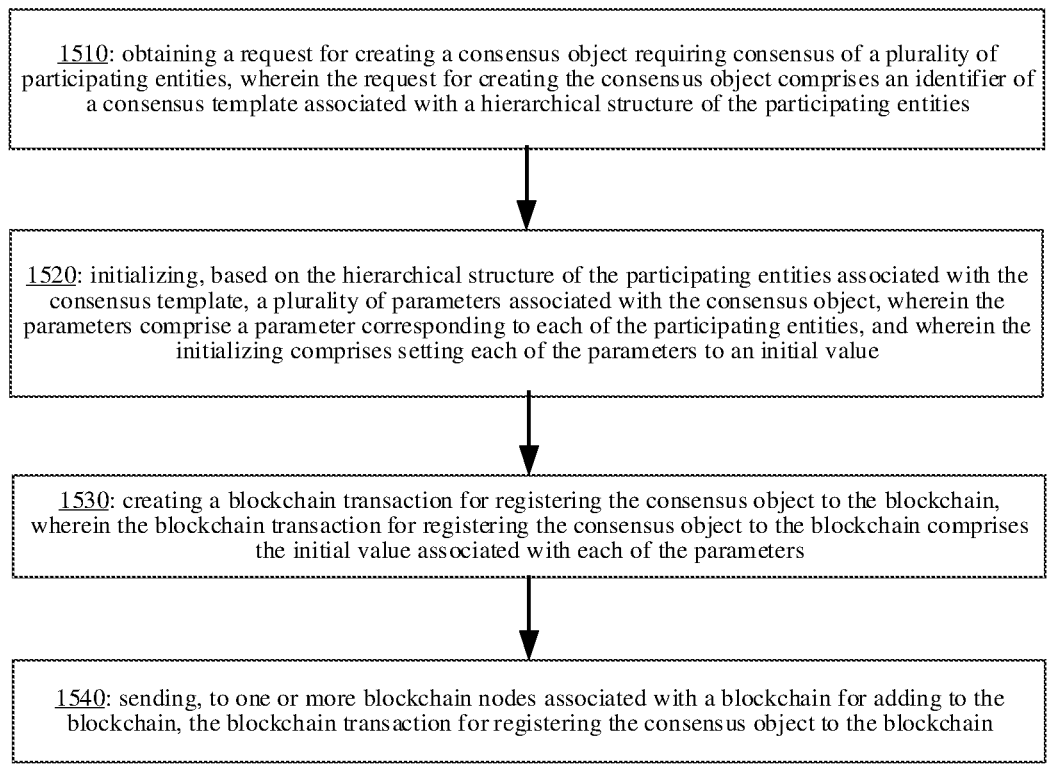
FIG. 15 illustrates a method for registering a consensus object in accordance with some embodiments.

FIG. 15 illustrates a method for registering a consensus object in accordance with some embodiments. The method 1500 may be performed by a device, apparatus, or system for blockchain-based consensus management. The method 1500 may be performed by one or more components of the environment or system illustrated by FIGS. 1-3, such as one or more components of the consensus service 310 in FIG. 3. Depending on the implementation, the method 1500 may include additional, fewer, or alternative steps performed in various orders or in parallel.

Block 1510 includes obtaining a request for creating a consensus object requiring consensus of a plurality of participating entities, wherein the request for creating the consensus object comprises an identifier of a consensus template associated with a hierarchical structure of the participating entities.

Block 1520 includes initializing, based on the hierarchical structure of the participating entities associated with the consensus template, a plurality of parameters associated with the consensus object, wherein the parameters comprise a parameter corresponding to each of the participating entities, and wherein the initializing comprises setting each of the parameters to an initial value. In some embodiments, the initializing a plurality of parameters associated with the consensus object comprises: obtaining a tree structure representing the hierarchical structure of the participating entities, the tree structure comprising a plurality of nodes; generating an array comprising a plurality of positions, each of the positions corresponding to one of the nodes of the tree structure, wherein the positions respectively correspond to the parameters associated with the consensus object; and setting each of the positions of the array to the initial value for the parameter corresponding to the position.

Block 1530 includes creating a blockchain transaction for registering the consensus object to the blockchain, wherein the blockchain transaction for registering the consensus object to the blockchain comprises the initial value associated with each of the parameters. In some embodiments, the blockchain transaction further comprises a plurality of properties of the consensus object. The properties comprise: the identifier of the consensus template; an identifier of the consensus object; an identifier associated with each of one or more of the participating entities; a public key of a blockchain account associated with each of one or more of the participating entities; or a weight assigned to each of one or more of the participating entities.

Block 1540 includes sending, to one or more blockchain nodes associated with a blockchain for adding to the blockchain, the blockchain transaction for registering the consensus object to the blockchain.

In some embodiments, the obtaining a request for creating a consensus object comprises obtaining the request for creating the consensus object from a computing device associated with one of the participating entities associated with the consensus object. The method further comprises returning a confirmation for creation of the consensus object to the computing device associated with the one of the participating entities. In some embodiments, the method further comprises sending, to one or more computing devices associated with one or more of the participating entities associated with the consensus object, a notification for creation of the consensus object, wherein the notification comprises an identifier of the consensus object and a request for approval of the consensus object.

Figure 16:
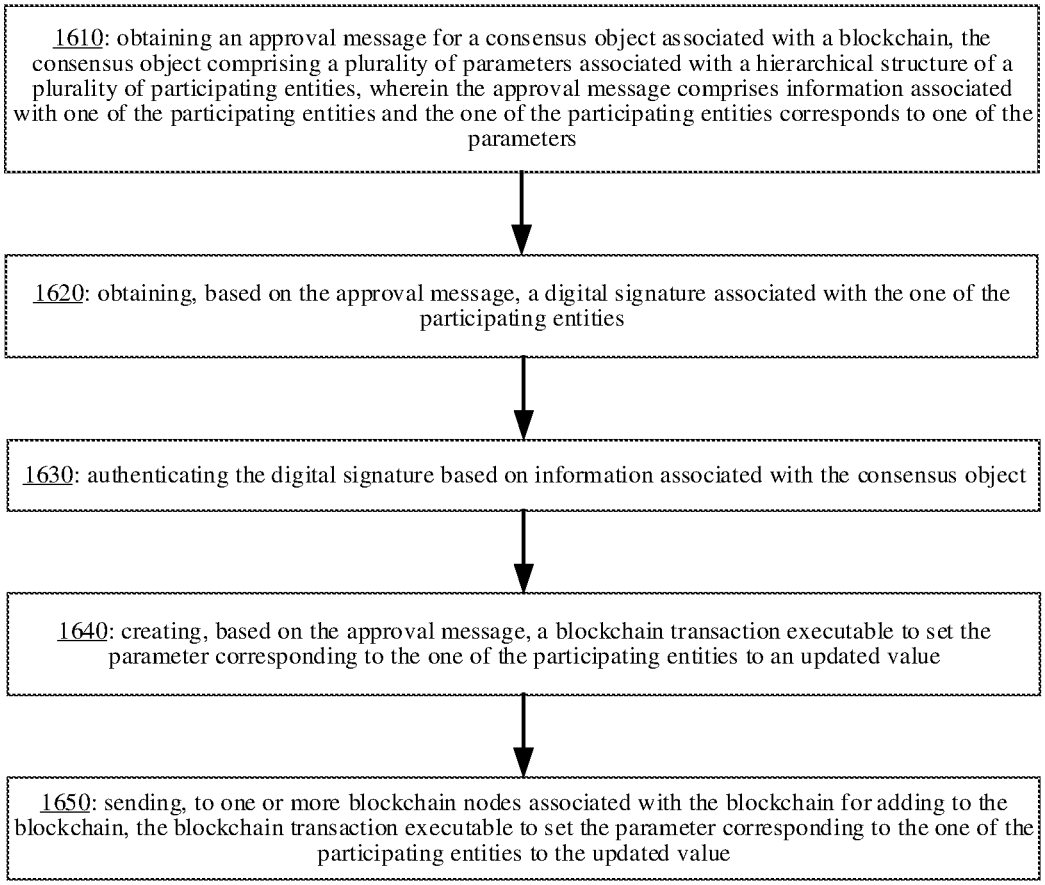
FIG. 16 illustrates a method for registering approval for a consensus object in accordance with some embodiments.

FIG. 16 illustrates a method for registering approval for a consensus object in accordance with some embodiments. The method 1600 may be performed by a device, apparatus, or system for blockchain-based consensus management. The method 1600 may be performed by one or more components of the environment or system illustrated by FIGS. 1-3, such as one or more components of the consensus service 310 in FIG. 3. Depending on the implementation, the method 1600 may include additional, fewer, or alternative steps performed in various orders or in parallel.

Block 1610 includes obtaining an approval message for a consensus object associated with a blockchain, the consensus object comprising a plurality of parameters associated with a hierarchical structure of a plurality of participating entities, wherein the approval message comprises information associated with one of the participating entities and the one of the participating entities corresponds to one of the parameters.

Block 1620 includes obtaining, based on the approval message, a digital signature associated with the one of the participating entities. In some embodiments, the obtaining a digital signature associated with the one of the participating entities comprises: obtaining the digital signature from the approval message for the consensus object. In some embodiments, the obtaining a digital signature associated with the one of the participating entities comprises: obtaining identity information associated with the one of the participating entities from the approval message for the consensus object; authenticating the identity information associated with the one of the participating entities; retrieving, based on the obtained identity information, a private key associated with the one of the participating entities; and generating the digital signature based on the private key associated with the one of the participating entities.

Block 1630 includes authenticating the digital signature based on information associated with the consensus object. In some embodiments, the authenticating the digital signature comprises: obtaining a public key associated with the one of the participating entities from information associated with the consensus object; and verifying, based on the public key, that the digital signature is created based on a private key corresponding to the public key.

Block 1640 includes creating, based on the approval message, a blockchain transaction executable to set the parameter corresponding to the one of the participating entities to an updated value. In some embodiments, the blockchain transaction executable to set the parameter corresponding to the one of the participating entities to the updated value is executable to invoke a blockchain contract configured to maintain values of the parameters associated with the consensus object. In some embodiments, the blockchain transaction executable to set the parameter corresponding to the one of the participating entities to an updated value is further executable to set one or more other parameters associated with the consensus object to one or more updated values, respectively, wherein each of the other parameters has a dependency relationship with the parameter corresponding to the one of the participating entities.

In some embodiments, the creating a blockchain transaction executable to set the parameter corresponding to the one of the participating entities to an updated value comprises: obtaining a tree structure representing the hierarchical structure of the participating entities, the tree structure comprising a plurality of nodes, wherein the nodes of the tree structure respectively correspond to the parameters associated with the consensus object; identifying, from the tree structure, one or more other nodes in a branch connecting the node corresponding to the parameter of the one of the participating entities to a root node of the tree structure; and determining an updated value for each of the other nodes and the root node. In some embodiments, the determining an updated value for each of the other nodes and the root node comprises, for each of the other nodes: determining the updated value of the other node to be a weighted sum of one or more values associated with one or more child nodes of the other node.

Block 1650 includes sending, to one or more blockchain nodes associated with the blockchain for adding to the blockchain, the blockchain transaction executable to set the parameter corresponding to the one of the participating entities to the updated value.

In some embodiments, the obtaining an approval message for the consensus object comprises obtaining the approval message for the consensus object from a computing device associated with the one of the participating entities associated with the consensus template. The method further comprises returning a confirmation for successful signing of the consensus object to the computing device associated with the one of the participating entities.

In some embodiments, the method further comprises: obtaining, from the blockchain, one or more updated values of one or more of the parameters associated with the consensus object; determining, based on the one or more updated values, that one or more criteria for determining approval of the consensus object are satisfied; and generating a blockchain transaction comprising a proof of the approval of the consensus object. In some embodiments, the method further comprises: sending, to one or more blockchain nodes associated with the blockchain for adding to the blockchain, the blockchain transaction comprising the proof of the approval of the consensus object. In some embodiments, the method further comprises: sending, to one or more blockchain nodes associated with a different blockchain for adding to the different blockchain, the blockchain transaction comprising the proof of the approval of the consensus object. In some embodiments, the blockchain transaction comprising the proof of the approval of the consensus object is executable to invoke a blockchain contract executable to trigger one or more blockchain transactions based on the approval of the consensus object. In some embodiments, the one or more criteria for determining approval of the consensus object comprise: a required number of participating entities approving the consensus object; or one or more required participating entities approving the consensus object.

FIG. 17 illustrates a method for providing status information of a consensus object in accordance with some embodiments. The method 1700 may be performed by a device, apparatus, or system for blockchain-based consensus management. The method 1700 may be performed by one or more components of the environment or system illustrated by FIGS. 1-3, such as one or more components of the consensus service 310 in FIG. 3. Depending on the implementation, the method 1700 may include additional, fewer, or alternative steps performed in various orders or in parallel.

Block 1710 includes obtaining a request for a status of a consensus object associated with a blockchain, wherein the consensus object comprises a plurality of parameters associated with a hierarchical structure of a plurality of participating entities.

Block 1720 includes obtaining, from the blockchain, a plurality of values respectively associated with the parameters of the consensus object.

Block 1730 includes generating, based on the plurality of values, a status summary of the consensus object. In some embodiments, the status summary of the consensus object comprises: a proof of approval of the consensus object. In some embodiments, the status summary of the consensus object comprises: identity information associated with each of one or more of the participating entities that have approved the consensus object; a digital signature associated with each of the one or more of the participating entities that have approved the consensus object; or a weight assigned to each of the one or more of the participating entities that have approved the consensus object. In some embodiments, the status summary of the consensus object comprises a JavaScript Object Notation (JSON) file.

In some embodiments, the generating a status summary of the consensus object comprises: constructing, based on information associated with the consensus object, a tree structure corresponding to the hierarchical structure of the participating entities; and generating the status summary of the consensus object based on the tree structure. In some embodiments, the tree structure comprises a plurality of nodes, the plurality of nodes comprising a root node, one or more branch nodes, and a plurality of leaf nodes. Each of the nodes of the tree structure corresponds to one of the plurality of parameters associated with the consensus object. The status summary comprises a value of the parameter corresponding to the root node of the tree structure. In some embodiments, the information associated with the consensus object comprises an array of a plurality of entries respectively corresponding to the parameters of the consensus object. The constructing a tree structure comprises organizing the array of entries according to the hierarchical structure of the participating entities.

In some embodiments, the constructing a tree structure comprises: creating a stack for containing one or more of the entries in the array; and for each of the entries in the array: obtaining the entry from the array; updating the stack based on the obtained entry; and adding the obtained entry to the tree structure, wherein a position of the obtained entry in the tree structure is based on the updated stack. In some embodiments, the updating the stack based on the obtained entry comprises: adding the obtained entry to the stack; or removing one or more entries from the stack. In some embodiments, the constructing a tree structure further comprises: creating one or more indices associated with the tree structure; updating the one or more indices based on the each obtained entry; and updating the stack based further on the one or more updated indices.

Block 1740 includes returning the status summary of the consensus object.

FIG. 18 illustrates a block diagram of a computer system for registering a consensus template in accordance with some embodiments. The system 1800 may be an example of an implementation of one or more components of the consensus service 310 in FIG. 3 or one or more other components illustrated in FIGS. 1-3. The method 1400 may be implemented by the computer system 1800. The computer system 1800 may comprise one or more processors and one or more non-transitory computer-readable storage media (e.g., one or more memories) coupled to the one or more processors and configured with instructions executable by the one or more processors to cause the system or device (e.g., the processor) to perform, for example, the method 1400. The computer system 1800 may comprise various units/modules corresponding to the instructions (e.g., software instructions). In some embodiments, the computer system 1800 may be referred to as an apparatus for blockchain-based consensus management. The apparatus may comprise an obtaining module 1810 for obtaining a request for creating a consensus template, wherein the request comprises information about a plurality of participating entities associated with the consensus template; a generating module 1820 for generating, based on the request, a dataset representing a hierarchical structure of the participating entities associated with the consensus template; a creating module 1830 for creating a blockchain transaction for registering the consensus template to a blockchain, wherein the blockchain transaction comprises the dataset representing the hierarchical structure of the participating entities; and a sending module 1840 for sending, to one or more blockchain nodes associated with the blockchain for adding to the blockchain, the blockchain transaction for registering the consensus template to the blockchain.

Figure 19:
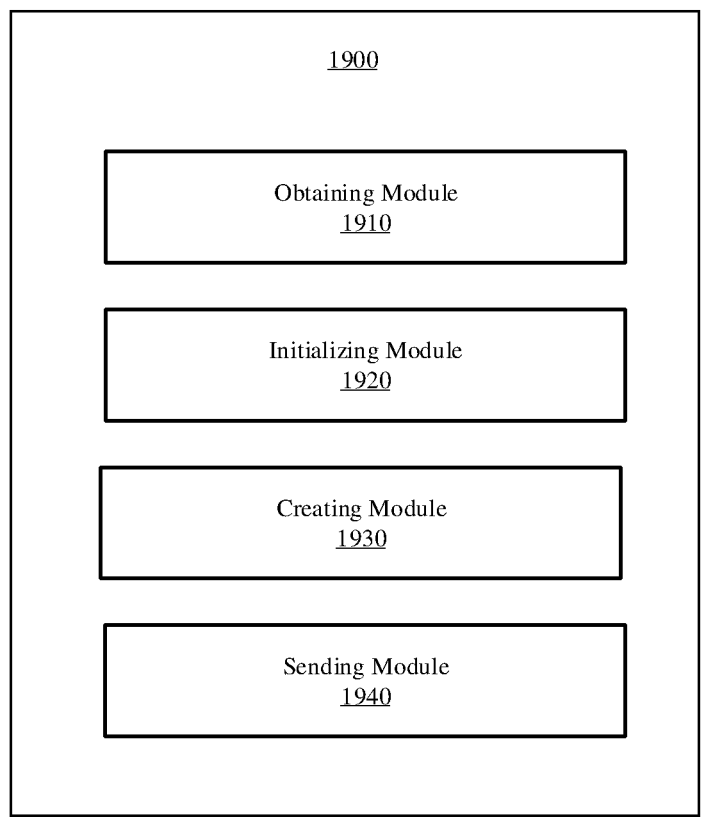
FIG. 19 illustrates a block diagram of a computer system for registering a consensus object in accordance with some embodiments.

FIG. 19 illustrates a block diagram of a computer system for registering a consensus object in accordance with some embodiments. The system 1900 may be an example of an implementation of one or more components of the consensus service 310 in FIG. 3 or one or more other components illustrated in FIGS. 1-3. The method 1500 may be implemented by the computer system 1900. The computer system 1900 may comprise one or more processors and one or more non-transitory computer-readable storage media (e.g., one or more memories) coupled to the one or more processors and configured with instructions executable by the one or more processors to cause the system or device (e.g., the processor) to perform, for example, the method 1500. The computer system 1900 may comprise various units/modules corresponding to the instructions (e.g., software instructions). In some embodiments, the computer system 1900 may be referred to as an apparatus for blockchain-based consensus management. The apparatus may comprise an obtaining module 1910 for obtaining a request for creating a consensus object requiring consensus of a plurality of participating entities, wherein the request for creating the consensus object comprises an identifier of a consensus template associated with a hierarchical structure of the participating entities; an initializing module 1920 for initializing, based on the hierarchical structure of the participating entities associated with the consensus template, a plurality of parameters associated with the consensus object, wherein the parameters comprise a parameter corresponding to each of the participating entities, and wherein the initializing comprises setting each of the parameters to an initial value; a creating module 1930 for creating a blockchain transaction for registering the consensus object to the blockchain, wherein the blockchain transaction for registering the consensus object to the blockchain comprises the initial value associated with each of the parameters; and a sending module 1940 for sending, to one or more blockchain nodes associated with a blockchain for adding to the blockchain, the blockchain transaction for registering the consensus object to the blockchain.

Figure 20:
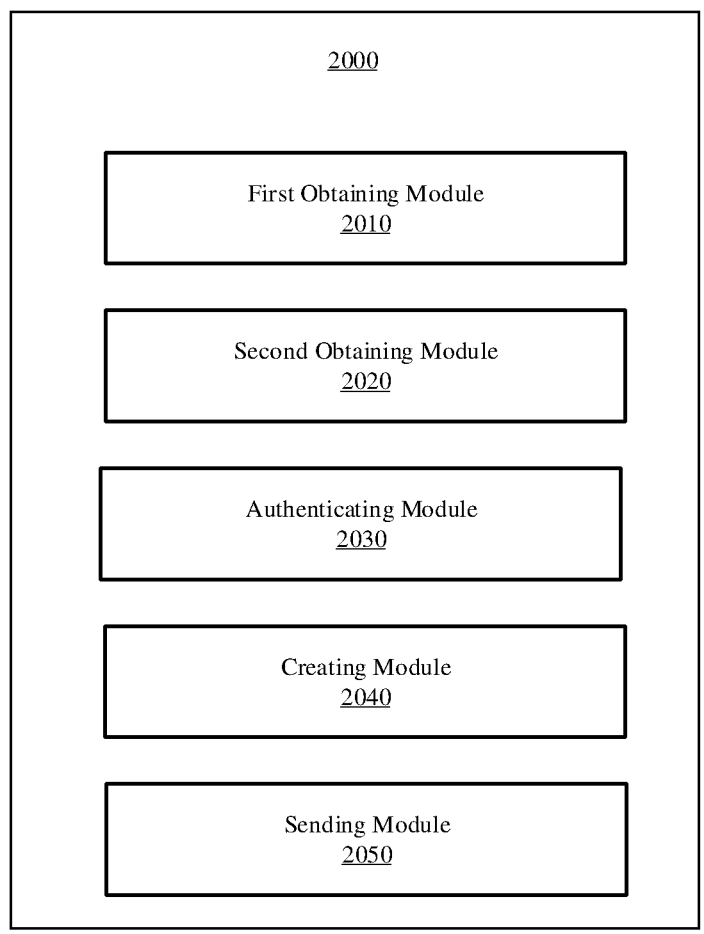
FIG. 20 illustrates a block diagram of a computer system for registering approval for a consensus object in accordance with some embodiments.

FIG. 20 illustrates a block diagram of a computer system for registering approval for a consensus object in accordance with some embodiments. The system 2000 may be an example of an implementation of one or more components of the consensus service 310 in FIG. 3 or one or more other components illustrated in FIGS. 1-3. The method 1600 may be implemented by the computer system 2000. The computer system 2000 may comprise one or more processors and one or more non-transitory computer-readable storage media (e.g., one or more memories) coupled to the one or more processors and configured with instructions executable by the one or more processors to cause the system or device (e.g., the processor) to perform, for example, the method 1600. The computer system 2000 may comprise various units/modules corresponding to the instructions (e.g., software instructions). In some embodiments, the computer system 2000 may be referred to as an apparatus for blockchain-based consensus management. The apparatus may comprise a first obtaining module 2010 for obtaining an approval message for a consensus object associated with a blockchain, the consensus object comprising a plurality of parameters associated with a hierarchical structure of a plurality of participating entities, wherein the approval message comprises information associated with one of the participating entities and the one of the participating entities corresponds to one of the parameters; a second obtaining module 2020 for obtaining, based on the approval message, a digital signature associated with the one of the participating entities; an authenticating module 2030 for authenticating the digital signature based on information associated with the consensus object; a creating module 2040 for creating, based on the approval message, a blockchain transaction executable to set the parameter corresponding to the one of the participating entities to an updated value; and a sending module 2050 for sending, to one or more blockchain nodes associated with the blockchain for adding to the blockchain, the blockchain transaction executable to set the parameter corresponding to the one of the participating entities to the updated value.

Figure 21:
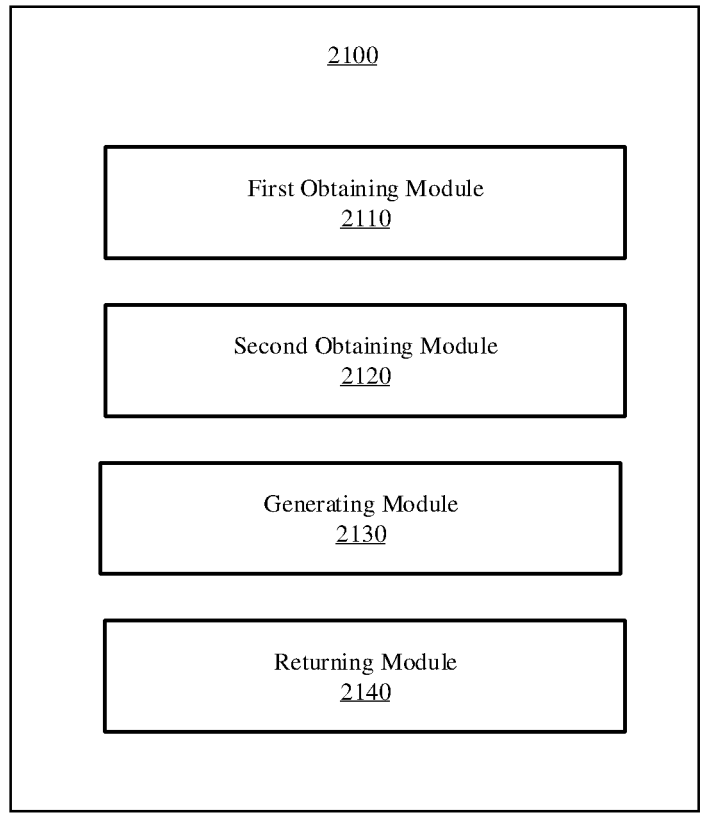
FIG. 21 illustrates a block diagram of a computer system for providing status information of a consensus object in accordance with some embodiments.

FIG. 21 illustrates a block diagram of a computer system for providing status information of a consensus object in accordance with some embodiments. The system 2100 may be an example of an implementation of one or more components of the consensus service 310 in FIG. 3 or one or more other components illustrated in FIGS. 1-3. The method 1700 may be implemented by the computer system 2100. The computer system 2100 may comprise one or more processors and one or more non-transitory computer-readable storage media (e.g., one or more memories) coupled to the one or more processors and configured with instructions executable by the one or more processors to cause the system or device (e.g., the processor) to perform, for example, the method 1700. The computer system 2100 may comprise various units/modules corresponding to the instructions (e.g., software instructions). In some embodiments, the computer system 2100 may be referred to as an apparatus for blockchain-based consensus management. The apparatus may comprise a first obtaining module 2110 for obtaining a request for a status of a consensus object associated with a blockchain, wherein the consensus object comprises a plurality of parameters associated with a hierarchical structure of a plurality of participating entities; a second obtaining module 2120 for obtaining, from the blockchain, a plurality of values respectively associated with the parameters of the consensus object; a generating module 2130 for generating, based on the plurality of values, a status summary of the consensus object; and a returning module 2140 for returning the status summary of the consensus object.

The techniques described herein may be implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. The special-purpose computing devices may be implemented as personal computers, laptops, cellular phones, camera phones, smart phones, personal digital assistants, media players, navigation devices, email devices, game consoles, tablet computers, wearable devices, or a combination thereof. Computing device(s) may be generally controlled and coordinated by operating system software. Conventional operating systems control and schedule computer processes for execution, perform memory management, provide file system, networking, I/O services, and provide a user interface functionality, such as a graphical user interface ("GUI"), among other things. The various systems, apparatuses, storage media, modules, and units described herein may be implemented in the special-purpose computing devices, or one or more computing chips of the one or more special-purpose computing devices. In some embodiments, the instructions described herein may be implemented in a virtual machine on the special-purpose computing device. When executed, the instructions may cause the special-purpose computing device to perform various methods described herein. The virtual machine may include a software, hardware, or a combination thereof.

Figure 22:
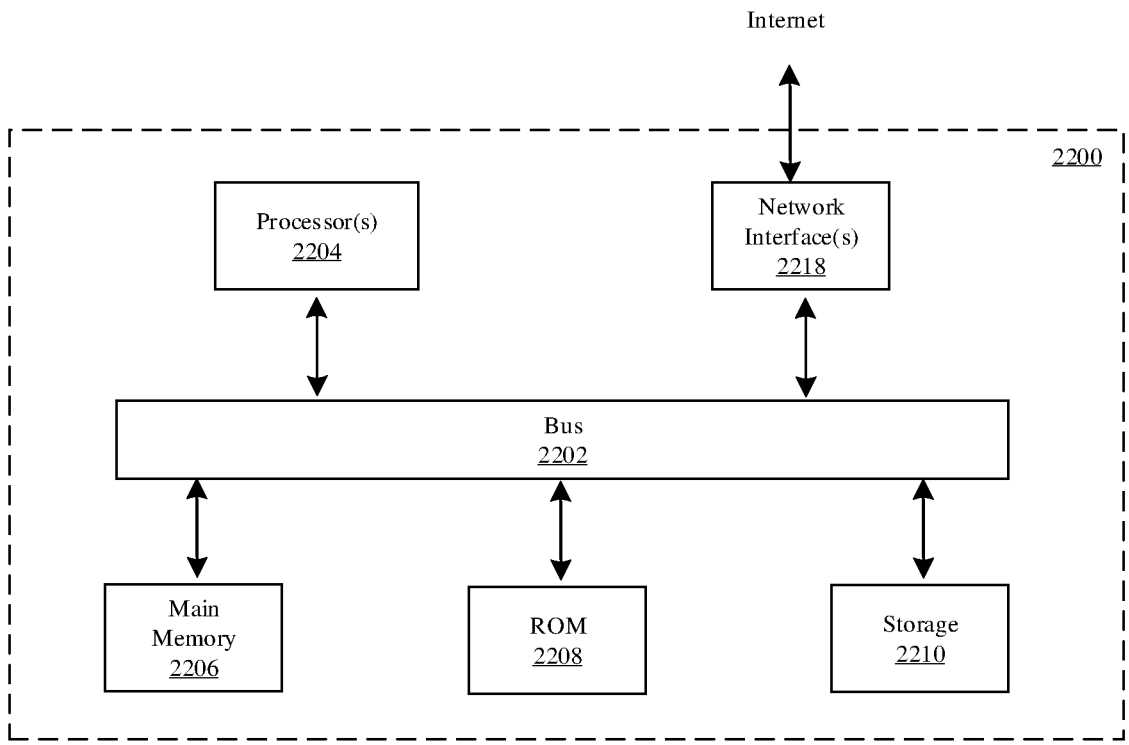
FIG. 22 illustrates a block diagram of a computer system in which any of the embodiments described herein may be implemented.

FIG. 22 illustrates a block diagram of a computer system in which any of the embodiments described herein may be implemented. The system 2200 may be implemented in any of the components of the environments or systems illustrated in FIGS. 1-3. The software applications or services illustrated in FIGS. 1-3 may be implemented and operated on the system 2200. One or more of the example methods or processes illustrated by FIGS. 4, 7, 9, 11, 13-17 may be performed by one or more implementations of the computer system 2200.

The computer system 2200 may include a bus 2202 or other communication mechanism for communicating information, one or more hardware processor(s) 2204 coupled with bus 2202 for processing information. Hardware processor(s) 2204 may be, for example, one or more general purpose microprocessors.

The computer system 2200 may also include a main memory 2206, such as a random access memory (RAM), cache and/or other dynamic storage devices, coupled to bus 2202 for storing information and instructions executable by processor(s) 2204. Main memory 2206 also may be used for storing temporary variables or other intermediate information during execution of instructions executable by processor(s) 2204. Such instructions, when stored in storage media accessible to processor(s) 2204, render computer system 2200 into a special-purpose machine that is customized to perform the operations specified in the instructions. The computer system 2200 may further include a read only memory (ROM) 2208 or other static storage device coupled to bus 2202 for storing static information and instructions for processor(s) 2204. A storage device 2210, such as a magnetic disk, optical disk, or USB thumb drive (Flash drive), etc., may be provided and coupled to bus 2202 for storing information and instructions.

The computer system 2200 may implement the techniques described herein using customized hard-wired logic, one or more ASICs or FPGAs, firmware and/or program logic which in combination with the computer system causes or programs computer system 2200 to be a special-purpose machine. According to one embodiment, the operations, methods, and processes described herein are performed by computer system 2200 in response to processor(s) 2204 executing one or more sequences of one or more instructions contained in main memory 2206. Such instructions may be read into main memory 2206 from another storage medium, such as storage device 2210. Execution of the sequences of instructions contained in main memory 2206 may cause processor(s) 2204 to perform the process steps described herein. In alternative embodiments, hard-wired circuitry may be used in place of or in combination with software instructions.

The main memory 2206, the ROM 2208, and/or the storage device 2210 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 2210. Volatile media includes dynamic memory, such as main memory 2206. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 2200 may include a network interface 2218 coupled to bus 2202. Network interface 2218 may provide a two-way data communication coupling to one or more network links that are connected to one or more local networks. For example, network interface 2218 may be an integrated services digital network (ISDN) card, cable modem, satellite modem, or a modem to provide a data communication connection to a corresponding type of telephone line. As another example, network interface 2218 may be a local area network (LAN) card to provide a data communication connection to a compatible LAN (or WAN component to communicated with a WAN). Wireless links may also be implemented. In any such implementation, network interface 2218 may send and receive electrical, electromagnetic or optical signals that carry digital data streams representing various types of information.

The computer system 2200 can send messages and receive data, including program code, through the network(s), network link and network interface 2218. In the Internet example, a server might transmit a requested code for an application program through the Internet, the ISP, the local network and the network interface 2218.

The received code may be executed by processor(s) 2204 as it is received, and/or stored in storage device 2210, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub-combinations are intended to fall within the scope of this specification. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The examples of blocks or states may be performed in serial, in parallel, or in some other manner. Blocks or states may be added to or removed from the disclosed embodiments. The examples of systems and components described herein may be configured differently than described. For example, elements may be added to, removed from, or rearranged compared to the disclosed embodiments.

The various operations of methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some embodiments, the processors or processor-implemented engines may be located in a single geographic location (e.g., within a home environment, an office environment, or a server farm). In other embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific embodiments, various modifications and changes may be made to these embodiments without departing from the broader scope of embodiments of the specification. The Detailed Description should not to be taken in a limiting sense, and the scope of various embodiments is defined only by the appended claims, along with the full range of equivalents to which such claims are entitled. Furthermore, related terms (such as "first," "second," "third," etc.) used herein do not denote any order, height, or importance, but rather are used to distinguish one element from another element. Furthermore, the terms "a," "an," and "plurality" do not denote a limitation of quantity herein, but rather denote the presence of at least one of the articles mentioned. In addition, herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The invention claimed is:

1. A computer-implemented method for blockchain-based consensus management, comprising:
    obtaining a request for creating a consensus template, wherein the request comprises information about a plurality of participating entities associated with the consensus template and one or more criteria for determining achievement of consensus, wherein the information comprises a weight assigned to each of the participating entities;
    generating, based on the request for creating the consensus template, a dataset representing a hierarchical structure of the participating entities associated with the consensus template, wherein:
        the hierarchical structure comprises a plurality of nodes each corresponding to one of the participating entities and being assigned the weight assigned to the one of the participating entities,
        for a parent node in the hierarchical structure that has one or more child nodes, a status of the parent node depends on a status and a weight of each of the one or more child nodes, and
        the one or more criteria for determining achievement of consensus comprises an aggregated weight of the participating entities;
    creating a blockchain transaction for registering the consensus template to a blockchain, wherein the blockchain transaction for registering the consensus template comprises the dataset representing the hierarchical structure of the participating entities; and
    storing the dataset representing the hierarchical structure of the participating entities in a block of the blockchain by sending, to one or more blockchain nodes associated with the blockchain for adding to the blockchain, the blockchain transaction for registering the consensus template to the blockchain.

2. The method of claim 1, wherein the information about the plurality of participating entities further comprises:
    an identifier associated with each of one or more of the participating entities;
    a public key of a blockchain account associated with each of one or more of the participating entities;
    contact information associated with each of one or more of the participating entities; or
    information associated with the hierarchical structure of the participating entities.

3. The method of claim 1, further comprising:
    obtaining, from the request for creating the consensus template, the one or more criteria for determining achievement of consensus; and
    storing the one or more criteria for determining achievement of consensus.

4. The method of claim 1, wherein the request for creating the consensus template comprises a JavaScript Object Notation (JSON) file.

5. The method of claim 1, wherein the generating a dataset representing a hierarchical structure of the participating entities associated with the consensus template comprises:
    parsing the request for creating the consensus template to obtain a tree structure representing the hierarchical structure of the participating entities; and
    generating one or more arrays corresponding to the tree structure.

6. The method of claim 5, wherein:
the tree structure comprises a plurality of nodes, the plurality of nodes comprising a root node, one or more branch nodes, and a plurality of leaf nodes;
the tree structure comprises one or more weights respectively associated with one or more of the nodes of the tree structure; and
each of the leaf nodes corresponds to one of the participating entities associated with the consensus template.

7. The method of claim 6, wherein:
one or more of the leaf nodes each corresponds to an individual associated with an entity; and
a parent node of the one or more of the leaf nodes corresponds to the entity.

8. The method of claim 6, wherein the one or more arrays comprise:
an array comprising one or more serial numbers associated with one or more of the nodes of the tree structure;
an array comprising one or more serial numbers associated with one or more parent nodes of the one or more of the nodes of the tree structure; or
an array comprising the one or more weights respectively associated with the one or more of the nodes of the tree structure.

9. The method of claim 1, wherein the blockchain transaction for registering the consensus template to a blockchain is executable to invoke a blockchain contract configured to register one or more consensus templates to the blockchain.

10. The method of claim 1, wherein:
the obtaining a request for creating a consensus template comprises obtaining the request for creating the consensus template from a computing device associated with one of the participating entities associated with the consensus template; and
the method further comprises returning a confirmation for creation of the consensus template to the computing device associated with the one of the participating entities.

11. The method of claim 1, further comprising:
obtaining a request for creating a consensus object requiring consensus of a plurality of participating entities, wherein the request for creating the consensus object comprises an identifier of the consensus template;
initializing, based on the hierarchical structure of the participating entities associated with the consensus template, a plurality of parameters associated with the consensus object, wherein the parameters comprise a parameter corresponding to each of the participating entities, and wherein the initializing comprises setting each of the parameters to an initial value;
creating a blockchain transaction for registering the consensus object to the blockchain, wherein the blockchain transaction for registering the consensus object to the blockchain comprises the initial value associated with each of the parameters; and
sending, to one or more blockchain nodes associated with a blockchain for adding to the blockchain, the blockchain transaction for registering the consensus object to the blockchain.

12. The method of claim 11, wherein the blockchain transaction for registering the consensus object to the blockchain further comprises a plurality of properties of the consensus object, the properties comprising:
the identifier of the consensus template;
an identifier of the consensus object;
an identifier associated with each of one or more of the participating entities;
a public key of a blockchain account associated with each of one or more of the participating entities; or
the weight assigned to each of one or more of the participating entities.

13. The method of claim 11, wherein the initializing a plurality of parameters associated with the consensus object comprises:
obtaining a tree structure representing the hierarchical structure of the participating entities, the tree structure comprising a plurality of nodes;
generating an array comprising a plurality of positions, each of the positions corresponding to one of the nodes of the tree structure, wherein the positions respectively correspond to the parameters associated with the consensus object; and
setting each of the positions of the array to the initial value for the parameter corresponding to the position.

14. The method of claim 11, wherein:
the obtaining a request for creating a consensus object comprises obtaining the request for creating the consensus object from a computing device associated with one of the participating entities associated with the consensus object; and
the method further comprises returning a confirmation for creation of the consensus object to the computing device associated with the one of the participating entities.

15. The method of claim 11, further comprising:
sending, to one or more computing devices associated with one or more of the participating entities associated with the consensus object, a notification for creation of the consensus object, wherein the notification comprises an identifier of the consensus object and a request for approval of the consensus object.

16. The method of claim 1, further comprising:
obtaining an approval message for a consensus object associated with the blockchain, the consensus object comprising a plurality of parameters associated with the hierarchical structure of the participating entities, wherein the approval message comprises information associated with one of the participating entities and the one of the participating entities corresponds to one of the parameters;
obtaining, based on the approval message, a digital signature associated with the one of the participating entities;
authenticating the digital signature based on information associated with the consensus object;
creating, based on the approval message, a blockchain transaction executable to set the parameter corresponding to the one of the participating entities to an updated value; and
sending, to one or more blockchain nodes associated with the blockchain for adding to the blockchain, the blockchain transaction executable to set the parameter corresponding to the one of the participating entities to the updated value.

17. The method of claim 1, further comprising:
obtaining a request for a status of a consensus object associated with the blockchain, wherein the consensus object comprises a plurality of parameters associated with the hierarchical structure of the participating entities;
obtaining, from the blockchain, a plurality of values respectively associated with the parameters of the consensus object;

generating, based on the plurality of values, a status summary of the consensus object; and returning the status summary of the consensus object.

18. A non-transitory computer-readable storage medium for blockchain-based consensus management, configured with instructions executable by one or more processors to cause the one or more processors to perform operations comprising:

obtaining a request for creating a consensus template, wherein the request comprises information about a plurality of participating entities associated with the consensus template and one or more criteria for determining achievement of consensus, wherein the information comprises a weight assigned to each of the participating entities;

generating, based on the request for creating the consensus template, a dataset representing a hierarchical structure of the participating entities associated with the consensus template, wherein:

the hierarchical structure comprises a plurality of nodes each corresponding to one of the participating entities and being assigned the weight assigned to the one of the participating entities, for a parent node in the hierarchical structure that has one or more child nodes, a status of the parent node depends on a status and a weight of each of the one or more child nodes, and the one or more criteria for determining achievement of consensus comprises an aggregated weight of the participating entities;

creating a blockchain transaction for registering the consensus template to a blockchain, wherein the blockchain transaction for registering the consensus template comprises the dataset representing the hierarchical structure of the participating entities; and storing the dataset representing the hierarchical structure of the participating entities in a block of the blockchain by sending, to one or more blockchain nodes associated with the blockchain for adding to the blockchain, the blockchain transaction for registering the consensus template to the blockchain.

19. The medium of claim 18, wherein the information about the plurality of participating entities further comprises:

an identifier associated with each of one or more of the participating entities;

a public key of a blockchain account associated with each of one or more of the participating entities;

contact information associated with each of one or more of the participating entities; or information associated with the hierarchical structure of the participating entities.

20. A system for blockchain-based consensus management, comprising a processor and a non-transitory computer-readable storage medium storing instructions executable by the processor to cause the system to:

obtain a request for creating a consensus template, wherein the request comprises information about a plurality of participating entities associated with the consensus template and one or more criteria for determining achievement of consensus, wherein the information comprises a weight assigned to each of the participating entities;

generate, based on the request for creating the consensus template, a dataset representing a hierarchical structure of the participating entities associated with the consensus template, wherein:

the hierarchical structure comprises a plurality of nodes each corresponding to one of the participating entities and being assigned the weight assigned to the one of the participating entities, for a parent node in the hierarchical structure that has one or more child nodes, a status of the parent node depends on a status and a weight of each of the one or more child nodes, and the one or more criteria for determining achievement of consensus comprises an aggregated weight of the participating entities;

create a blockchain transaction for registering the consensus template to a blockchain, wherein the blockchain transaction for registering the consensus template comprises the dataset representing the hierarchical structure of the participating entities; and store the dataset representing the hierarchical structure of the participating entities in a block of the blockchain by sending, to one or more blockchain nodes associated with the blockchain for adding to the blockchain, the blockchain transaction for registering the consensus template to the blockchain.

* * * * *